United States Patent
Tsuji et al.

(10) Patent No.: US 7,182,427 B2
(45) Date of Patent: Feb. 27, 2007

(54) CUT-PROCESSING APPARATUS, CUT-PROCESSING METHOD IN CUT-PROCESSING APPARATUS, AND PROGRAM

(75) Inventors: Akinori Tsuji, Shiojiri (JP); Masaji Takayama, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/436,229

(22) Filed: May 17, 2006

(65) Prior Publication Data

US 2007/0016326 A1 Jan. 18, 2007

(30) Foreign Application Priority Data

Jul. 12, 2005 (JP) .............................. 2005-203543

(51) Int. Cl.
*B41J 2/165* (2006.01)
(52) U.S. Cl. .................. 347/32; 347/153; 347/157
(58) Field of Classification Search ............... 700/174; 347/32, 33, 30, 29, 37, 104, 153, 157; 400/26, 400/611, 617; 414/744.3, 745.3
See application file for complete search history.

(56) References Cited

U.S. PATENT DOCUMENTS 6,155,728 A * 12/2000 Sakaino et al. ............... 400/26
6,220,692 B1 * 4/2001 Iwaya et al. .................. 347/33
6,533,387 B2 * 3/2003 Simmons et al. ............. 347/32
2001/0028373 A1 * 10/2001 Iwaya et al. .................. 347/33
2002/0149642 A1 * 10/2002 Simmons et al. ............. 347/32

FOREIGN PATENT DOCUMENTS

JP 2002-001692 1/2002

* cited by examiner

*Primary Examiner*—Leo Picard
*Assistant Examiner*—Charles Kasenge
(74) *Attorney, Agent, or Firm*—Hogan & Hartson LLP

(57) ABSTRACT

A cut-processing apparatus generates tool move control data to reciprocate the tool, and sheet feed control data to feed the sheet; stores an amount of tool move loss due to backlash in the carriage gear train occurring at tool move direction shift, and an amount of sheet feed loss due to backlash in the sheet feed gear train occurring at sheet feed direction shift; and corrects the tool move control data based on the stored amount of tool move loss at tool move direction shift, and the sheet feed control data based on the stored amount of sheet feed loss at sheet feed direction shift.

8 Claims, 16 Drawing Sheets

Fig. 11A  RETURN CORRECTION DATA

| No. | STATE OF TOOL | DIRECTION OF ROTATION | INSERTED AMOUNT OF MOVE LOSS | INSERTING DIRECTION |
|---|---|---|---|---|
| 1 | UP | NORMAL→REVERSE | crb | REVERSE |
| 2 | UP | REVERSE→NORMAL | crb | NORMAL |
| 3 | DOWN | NORMAL→REVERSE | crb+chb(1)+chb(0) | REVERSE |
| 4 | DOWN | REVERSE→NORMAL | crb+chb(0)+chb(1) | NORMAL |

Fig. 11B  TOOL MOTION CORRECTION DATA

| No. | STATE OF TOOL | DIRECTION OF ROTATION | INSERTED AMOUNT OF MOVE LOSS | INSERTING DIRECTION |
|---|---|---|---|---|
| 1 | UP→DOWN | NORMAL→(TOOL SHIFT)→NORMAL | chb(1) | NORMAL |
| 2 | UP→DOWN | REVERSE→(TOOL SHIFT)→REVERSE | chb(0) | REVERSE |
| 3 | UP→DOWN | NORMAL→(TOOL SHIFT)→REVERSE | crb+chb(0) | REVERSE |
| 4 | UP→DOWN | REVERSE→(TOOL SHIFT)→NORMAL | crb+chb(1) | NORMAL |
| 5 | DOWN→UP | NORMAL→(TOOL SHIFT)→NORMAL | chb(1) | REVERSE |
| 6 | DOWN→UP | REVERSE→(TOOL SHIFT)→REVERSE | chb(0) | NORMAL |
| 7 | DOWN→UP | NORMAL→(TOOL SHIFT)→REVERSE | crb+chb(1) | REVERSE |
| 8 | DOWN→UP | REVERSE→(TOOL SHIFT)→NORMAL | crb+chb(0) | NORMAL |

Fig. 12A  RETURN CORRECTION DATA

| No. | STATE OF TOOL | DIRECTION OF ROTATION | INSERTED AMOUNT OF FEED LOSS | INSERTING DIRECTION |
|---|---|---|---|---|
| 1 | UP | NORMAL→REVERSE | grb | REVERSE |
| 2 | UP | REVERSE→NORMAL | grb | NORMAL |
| 3 | DOWN | NORMAL→REVERSE | grb+ghb(1)+ghb(0) | REVERSE |
| 4 | DOWN | REVERSE→NORMAL | grb+ghb(0)+ghb(1) | NORMAL |

Fig. 12B  TOOL MOTION CORRECTION DATA

| No. | STATE OF TOOL | DIRECTION OF ROTATION | INSERTED AMOUNT OF MOVE LOSS | INSERTING DIRECTION |
|---|---|---|---|---|
| 1 | UP→DOWN | NORMAL→(TOOL SHIFT)→NORMAL | ghb(1) | NORMAL |
| 2 | UP→DOWN | REVERSE→(TOOL SHIFT)→REVERSE | ghb(0) | REVERSE |
| 3 | UP→DOWN | NORMAL→(TOOL SHIFT)→REVERSE | grb+ghb(0) | REVERSE |
| 4 | UP→DOWN | REVERSE→(TOOL SHIFT)→NORMAL | grb+ghb(1) | NORMAL |
| 5 | DOWN→UP | NORMAL→(TOOL SHIFT)→NORMAL | ghb(1) | REVERSE |
| 6 | DOWN→UP | REVERSE→(TOOL SHIFT)→REVERSE | ghb(0) | NORMAL |
| 7 | DOWN→UP | NORMAL→(TOOL SHIFT)→REVERSE | grb+ghb(1) | REVERSE |
| 8 | DOWN→UP | REVERSE→(TOOL SHIFT)→NORMAL | grb+ghb(0) | NORMAL |

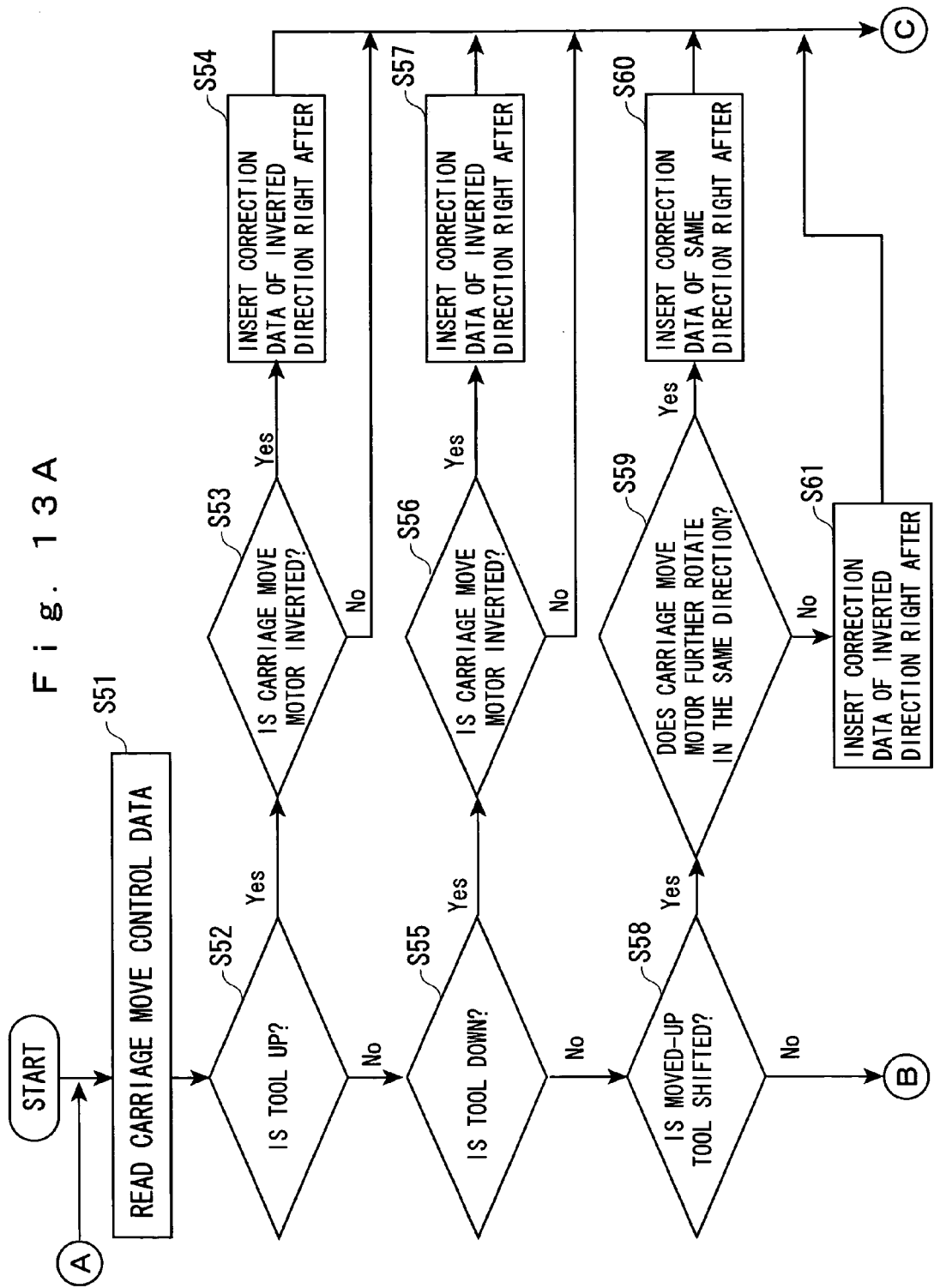

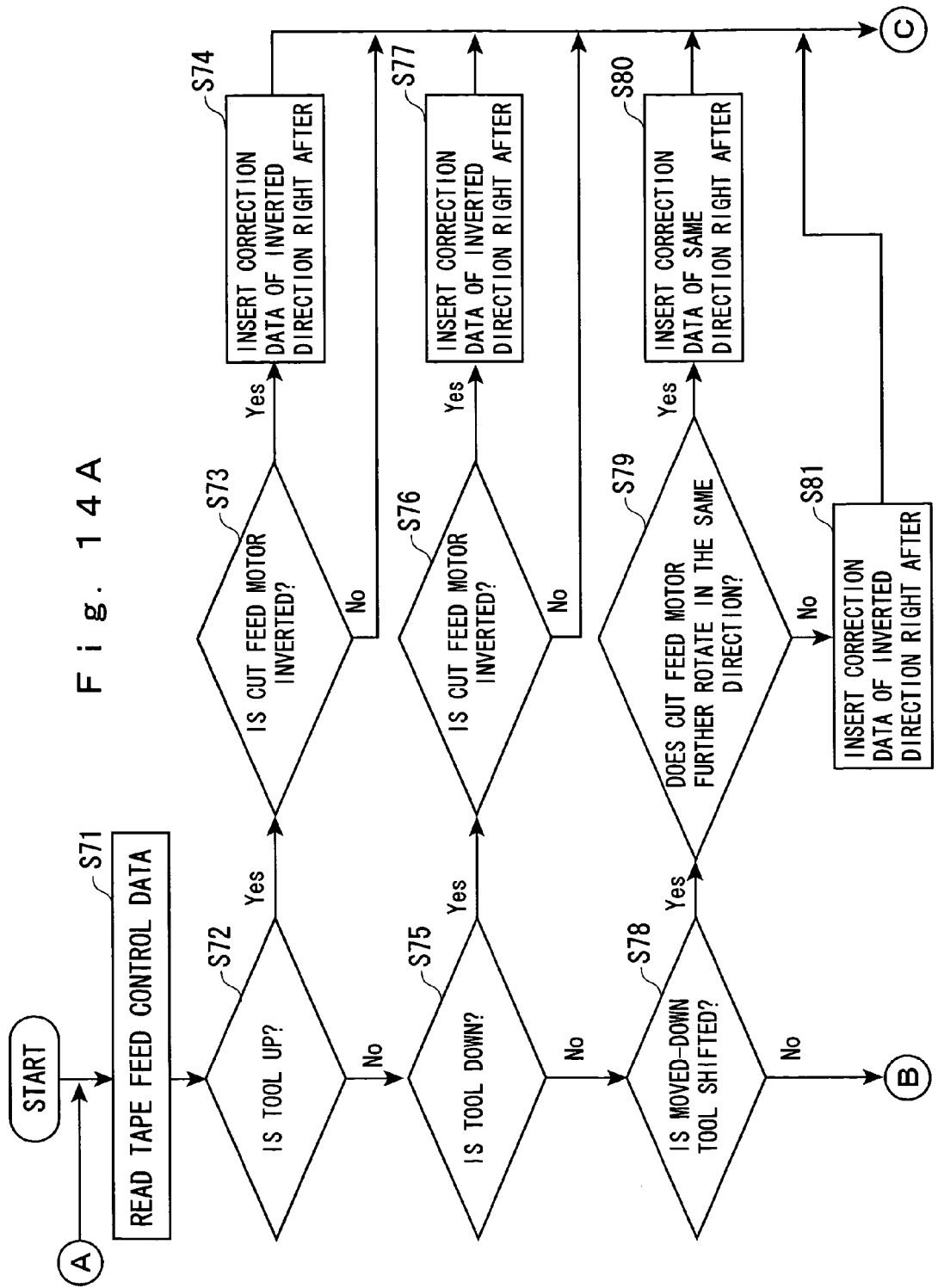

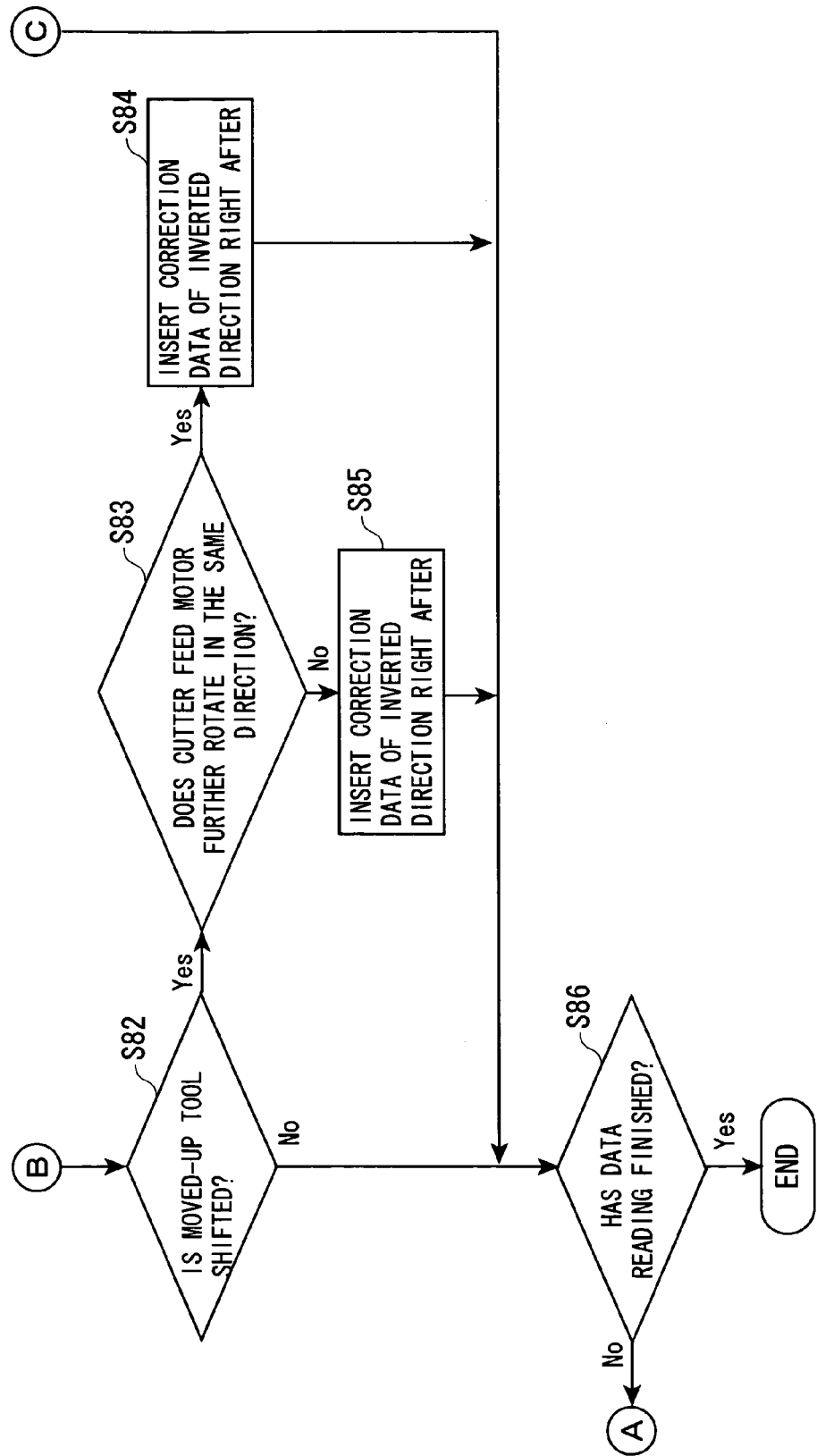

CUT-PROCESSING APPARATUS, CUT-PROCESSING METHOD IN CUT-PROCESSING APPARATUS, AND PROGRAM

The entire disclosure of Japanese Patent Application No. 2005-203543, filed Jul. 12, 2005, is expressly incorporated by reference herein.

BACKGROUND

1. Technical Field

The present invention relates to a cut-processing apparatus for cutting out (half-cutting) a cut-processing sheet (also referred to simply as a sheet) into an arbitrary shape. The term "cut-processing sheet" includes a piece of sheet or tape which is subjected to processing inclusive of cutting such as half-cutting and full-cutting. The term "half-cutting" means cutting a sheet only partially as seen in the thickness direction of the sheet in a manner to leave part of the sheet uncut. The term "half-cutting" is thus used as compared with the term "full-cutting" in which the sheet is completely cut off. The invention also relates to a cut-processing method which is performed in the cut-processing apparatus, as well as to a program.

2. Related Art

As this kind of cut-processing apparatus, there is known one in which a sheet feed mechanism which feeds a sheet in normal direction and in reverse (opposite) direction and a carriage move mechanism for reciprocating, or moving back and forth, a tool (i.e., a cutter tool or cutter edge) in a direction orthogonal to a sheet feed passage are driven in a synchronized manner to thereby cut the sheet into an arbitrary shape. JP-A-2002-1692 is an example of related art.

In this case, the sheet feed mechanism is made up of a feed motor which serves as a power source; a feed roller which feeds the sheet; and a gear train which transmits the power of rotating in the normal or reverse direction of rotation of the feed motor to the feed roller. Similarly, the carriage move mechanism is made up of: a carriage motor which serves as the power source; a tool carriage on which is mounted the tool itself; a timing belt which moves the tool back and forth; and a carriage gear train which transmits the power of rotating in the normal or reverse direction of rotation of the feed motor to a pulley of the timing belt. The feed gear train and the carriage gear train appropriately reduce the rotary power (rotational speed) of the feed motor and of the carriage motor which rotate at high speed, to thereby transmit the rotary power to the feed motor and the timing belt.

By the way, between a plurality of gears which constitute both the above-referenced gear trains, there is secured or provided a backlash to smooth the gear engagement. As a result, when the gear rotation of the conventional cut-processing apparatus is inverted (i.e., changes its direction of rotation), there occurs a feed loss due to the backlash (i.e., a loss in the sheet feeding and a loss in the tool feeding), thereby giving rise to a problem in that an error occurs between the cutting line (in the work of cutting out) in terms of the data and the actual cutting line. Similarly, there was also a problem in that an error occurs due to the deformation in the power transmission system such as deformation of the tool, or the like, due to the cutting resistance which the tool receives from the sheet.

SUMMARY

It is an advantage of the invention to provide a cut-processing apparatus, a cut-processing method in the cut-processing apparatus, and a program, in all of which the error which occurs between the cutting-out in terms of data and the actual cutting-out in the sheet can be reduced to the extent possible.

According to one aspect of the invention, there is provided a cut-processing apparatus comprising: tool reciprocating means for reciprocating a tool by normal/reverse direction of rotation of a carriage motor through a carriage power transmission system including a carriage gear train; sheet feeding means for feeding a sheet synchronized with, and orthogonal to a direction of, the reciprocation of the tool, by normal/reverse direction of rotation of a sheet feed motor through a sheet feed power transmission system including a sheet feed gear train so as to cut out the sheet based on input information; control data generating means for generating control data based on the input information, the control data including tool move control data to reciprocate the tool and sheet feed control data to feed the sheet; storing means for storing an amount of loss inclusive of tool move loss due to backlash in the carriage gear train occurring at tool move direction shift and sheet feed loss due to backlash in the sheet feed gear train occurring at sheet feed direction shift; and correcting means for correcting the control data inclusive of the tool move control data based on the stored amount of tool move loss and the sheet feed control data based on the stored amount of sheet feed loss.

According to another aspect of the invention, there is provided a cut-processing method in a cut-processing apparatus including: means for reciprocating a tool by normal/reverse direction of rotation of a carriage motor through a carriage power transmission system including a carriage gear train; and means for feeding a sheet synchronized with, and orthogonal to a direction of, the reciprocation of the tool, by normal/reverse direction of rotation of a sheet feed motor through a sheet feed power transmission system including a sheet feed gear train so as to cut out the sheet based on input information, the method comprising: generating control data inclusive of tool move control data to reciprocate the tool and sheet feed control data to feed the sheet; storing an amount of loss inclusive of tool move loss due to backlash in the carriage gear train occurring at tool move direction shift sheet feed loss due to backlash in the sheet feed gear train occurring at sheet feed direction shift; and correcting control data inclusive of the tool move control data based on the stored amount of tool move loss and the sheet feed control data based on the stored amount of sheet feed loss.

According to the above configurations, corrections are made of the control data for the tool move and of the control data for the sheet feed, taking into account the losses due to backlashes in the gear trains. It is therefore possible to control the operations of feeding the sheet and of moving the tool at the time of changing between normal direction and reverse direction of rotation so as to form an adequate moving locus. As a result, the cutting-out in terms of data and the actual cutting-out on the sheet coincide with each other, whereby cut-processing can be performed on the sheet at a high accuracy. In other words, the error attributable to mechanical accuracy can be corrected by means of correction in the software.

It is preferable that the amount of loss further includes an amount of deformation loss due to deformation of constituting members in at least one of the tool reciprocating means and the sheet feeding means.

According to another aspect of the invention, there is provided a cut-processing apparatus comprising: a tool carriage for receiving a power of normal/reverse direction of rotation of a carriage motor through a carriage power transmission system including a carriage gear train, thereby reciprocating a tool; a sheet feeder for transmitting a power of normal/reverse direction of rotation of a feed motor to a feed roller through a sheet feed power transmission system including a sheet feed gear train in a manner synchronized with the reciprocation of the tool, thereby feeding the sheet orthogonal to the direction of reciprocating the tool to perform cutting-out of the sheet based on an input information; a device for generating tool move control data to reciprocate the tool, and sheet feed control data to feed the sheet; a device for storing an amount of tool move loss including an amount of loss due to backlash in the carriage gear train occurring at tool move direction shift and an amount of deformation loss due to deformation of members in the carriage transmission system occurring through cutting resistance, in the tool move direction, of the tool at tool move direction shift and at start/finish of cutting-in of the tool in the tool move direction; a device for storing an amount of sheet feed loss due to backlash in the sheet feed gear train occurring at sheet feed direction shift and an amount of deformation loss due to deformation of members in the carriage transmission system occurring through cutting resistance, in the sheet feed direction, of the tool at tool move direction shift and at start/finish of cutting-in of the tool in the sheet feed direction; a device for correcting the tool move control data, based on the stored amount of tool move loss, at tool move direction shift and at start/finish of cutting-in of the tool in the sheet feed direction; and a device for correcting the sheet feed control data, based on the stored amount of sheet feed loss, at tool move direction shift and at start/finish of cutting-in of the tool in the sheet feed direction.

According to still another aspect of this invention, there is provided a cut-processing method in a cut-processing apparatus including: a tool carriage for receiving a power of normal/reverse direction of rotation of a carriage motor through a carriage power transmission system including a carriage gear train, thereby reciprocating a tool; and a sheet feeder for transmitting a power of normal/reverse direction of rotation of a feed motor to a feed roller through a sheet feed power transmission system including a sheet feed gear train in a manner synchronized with the reciprocation of the tool, thereby feeding the sheet orthogonal to the direction of reciprocating the tool to perform cutting-out of the sheet based on an input information, the method comprising: generating tool move control data to reciprocate the tool, and sheet feed control data to feed the sheet; storing an amount of tool move loss including an amount of loss due to backlash in the carriage gear train occurring at tool move direction shift and an amount of deformation loss due to deformation of members in the carriage transmission system occurring through cutting resistance, in the tool move direction, of the tool at tool move direction shift and at start/finish of cutting-in of the tool in the tool move direction; storing an amount of sheet feed loss due to backlash in the sheet gear train occurring at sheet feed direction shift and an amount of deformation loss due to deformation of members in the carriage transmission system occurring through cutting resistance, in the sheet feed direction, of the tool at tool move direction shift and at start/finish of cutting-in of the tool in the sheet feed direction; correcting the tool move control data, based on the stored amount of tool move loss, at tool move direction shift and at start/finish of cutting-in of the tool in the sheet feed direction; and correcting the sheet feed control data, based on the stored amount of sheet feed loss, at tool move direction shift and at start/finish of cutting-in of the tool in the sheet feed direction.

According to the above configurations, in addition to the losses due to the backlashes in the gear trains, the losses due to deformation of members, e.g., in the carriage transmission system are further taken into account in correcting the control data of the tool movement and the sheet feeding. Therefore, it is possible to perform cut-processing on the sheet in a more accurate manner.

It is preferable that the device for correcting the tool move control data corrects the tool move control data right after a shift point at the tool move direction shift and at the start/finish of cutting-in of the tool in the sheet feed direction, and that the device for correcting the sheet feed control data corrects the sheet feed control data right after a shift point at the sheet feed direction shift and at the start/finish of cutting-in of the tool in the sheet feed direction.

According to this configuration, by correcting the control data right after the shift point, it is possible to dispose the locus of cutting at an absolute position relative to the reference position for the tool and the sheet.

According to still another aspect of the invention, there is provided a program which causes a computer to function as each of the devices of the above-referenced cut-processing apparatus.

According to this configuration, a program is made available in which the control data for tool movement and the sheet feeding is corrected to the one taking into consideration the amount of loss in the tool movement and the sheet feeding. It is therefore possible to perform the cut-processing into a desired shape at a higher accuracy.

BRIEF DESCRIPTION OF THE DRAWINGS

The invention will be described with reference to the accompanying drawings, wherein like numbers reference like elements.

FIGS. 11A and 11B are tables showing examples of kind of carriage movement correction data.

FIGS. 12A and 12B are tables showing examples of kind of tape correction data.

FIG. 14 (shown by dividing into 14A and 14B) is a flow chart showing the insertion of tape feed correction data.

DESCRIPTION OF EXEMPLARY EMBODIMENTS

With reference to the accompanying drawings, a description will be made about a cut-processing apparatus according to an embodiment of the invention. This cut-processing apparatus produces a tape piece (a piece of tape) in which is formed a so-called cut-out character on a tape piece. The cut-out character is formed by cutting out a character inclusive of a sign, mark, letter, figure, or the like so that the cut-out character can thereafter be put to actual use by taking (or peeling) off the character portion. In other words, a processing tape (which is an example of a sheet) made up of a tape for separated characters (printing tape on which printing is made) and a release tape is paid (or fed) out of a tape cartridge for subjecting the tape for separated characters to printing. The printed portion of the tape for separated characters is then cut off (separated) by full-cutting. The tape piece thus obtained by completely cutting off by full-cutting is thereafter subjected to a further processing for forming cut-out line or lines on the cut-off tape piece, thereby forming the above-referenced tape piece. In this specification, the above-referenced "further processing" is mainly referred to as "cut-processing" (in the meaning that the work is not a simple cutting off or completely separating the printing tape from the release tape).

Figure 1:
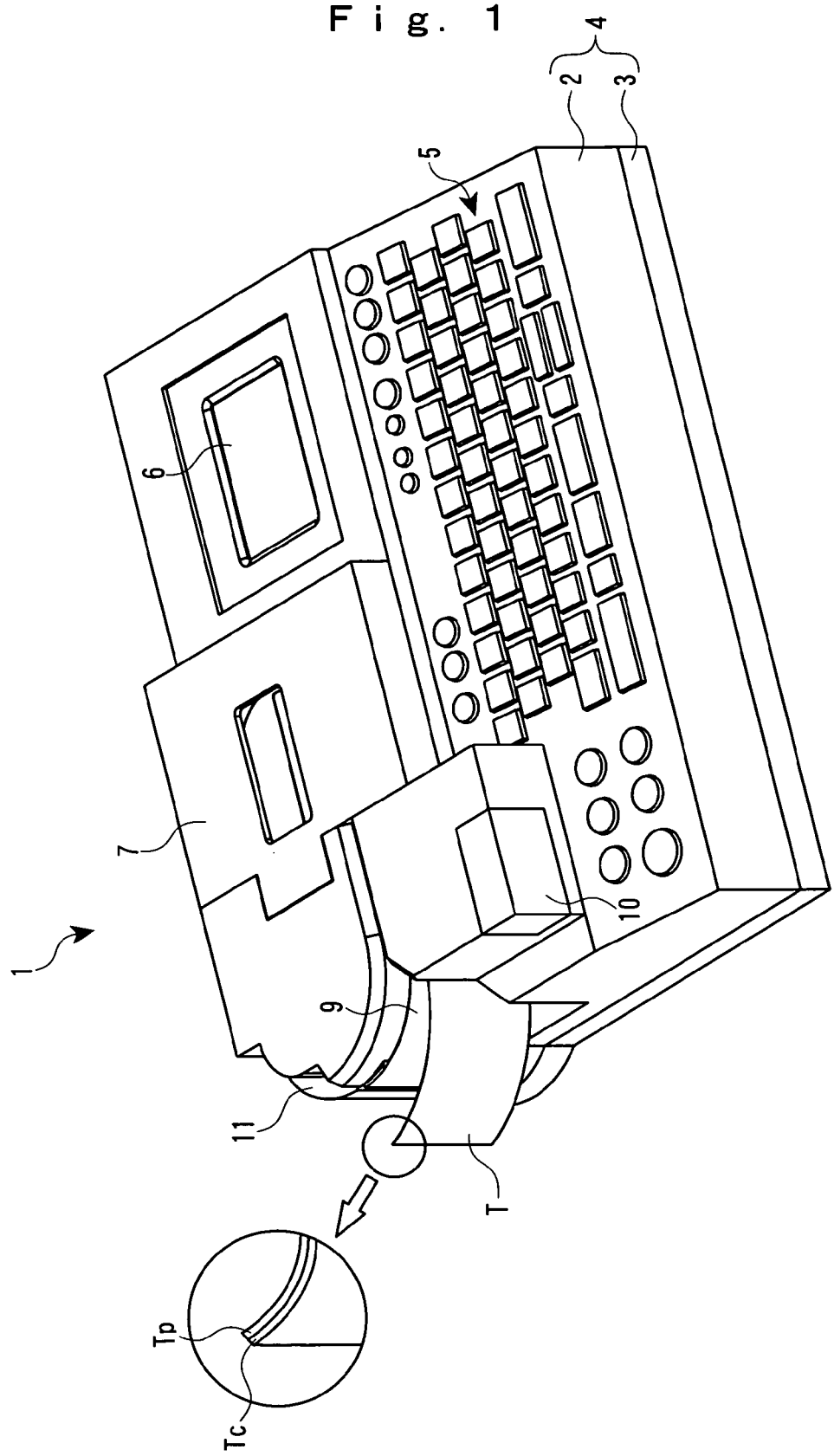
FIG. 1 is an outside perspective view of a cut-processing apparatus with a lid kept closed.

FIG. 1 is an outside perspective view of a cut-processing apparatus 1. As shown therein, the cut-processing apparatus 1 has an apparatus casing 4, as an outer frame, which is made up of an upper case 2 and a lower case 3. On an upper front surface of the upper case 2, there is provided a keyboard 5 which has a plurality of keys for use in inputting various data. The term "front" and "rear" is used as seen from an operator of the apparatus, i.e., the front side means the side closer to the operator. On an upper rear surface of the upper case 2, there is built in a display 6 on the right side. On the left side of the display 6, there is provided an open/close lid 7 for a cartridge in a manner capable of being, opened and closed at will. Inside the open/close lid 7 for the cartridge, there is formed a cartridge mounting portion 8 for detachably mounting therein a tape cartridge C (see FIG. 2). On the left-side surface of the upper case 2, there is formed a tape ejecting slot 9 for ejecting the processed tape (tape piece) T.

In the figure, reference numeral 10 denotes a lid for replacing a tool (or cutter edge) 64 (see FIG. 2) which is used in the cut-processing. Reference numeral 11 denotes an open/close lid for opening the tape container 61 (to be described hereinafter) which is used as a tape buffer at the time of cut-processing.

Figure 2:
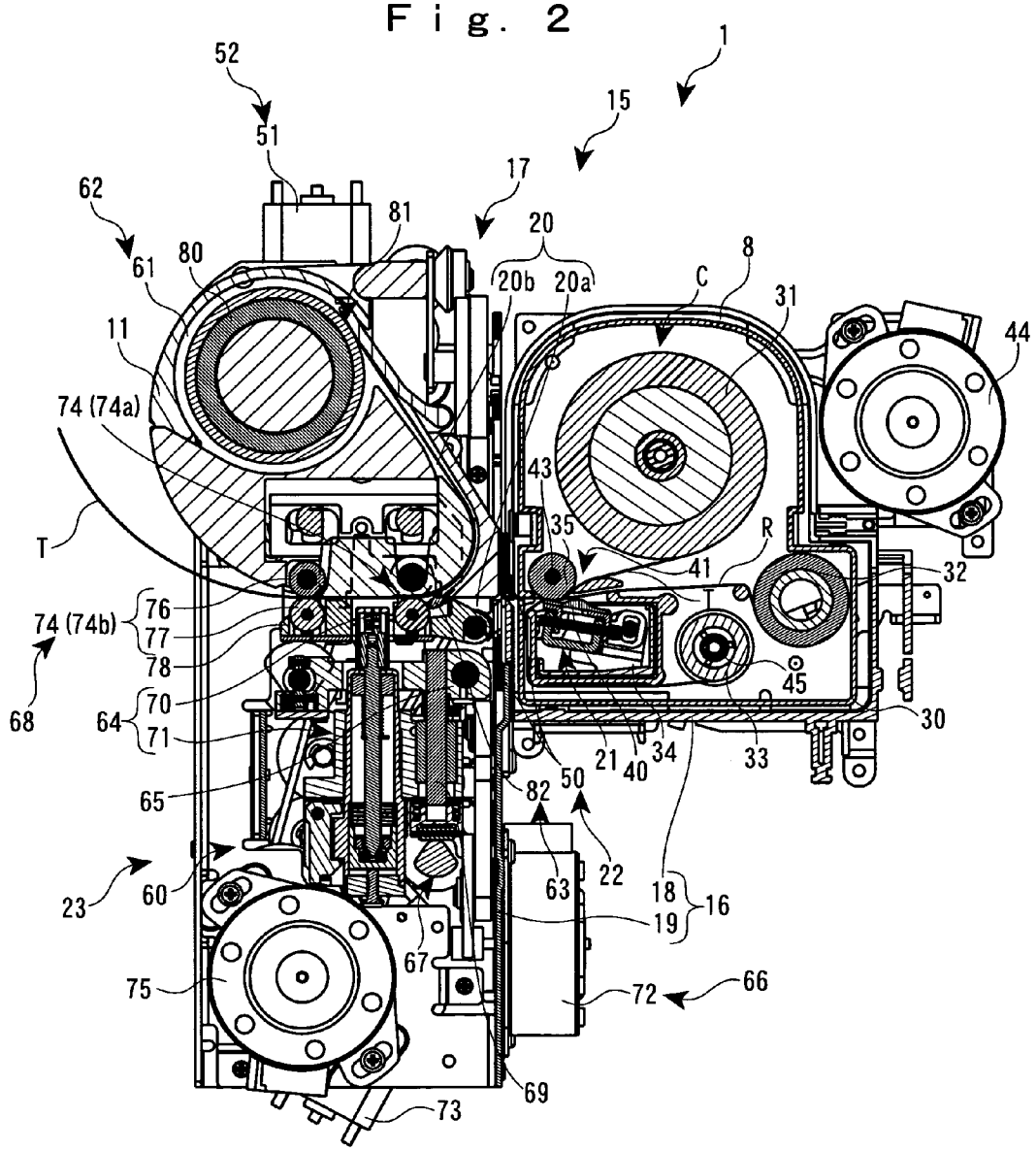
FIG. 2 is a sectional view thereof.

As shown in FIG. 2, an apparatus assembly 15 which is assembled into a unit is contained inside the apparatus casing 4. The apparatus assembly 15 is made up of a supporting frame 16 which is fixed to the apparatus casing 4, and an inner apparatus 17 which is built inside the supporting frame 16. The supporting frame 16 has a cartridge frame 18 which constitutes a cartridge mounting portion 8, and a common supporting frame 19.

The supporting frame 16 and the apparatus casing 4 together form a tape feed passage 20 which feeds the processing tape T paid out of the tape cartridge C. The tape feed passage 20 is made up of: that first feed passage 20a of the tape cartridge C which is linearly formed from the tape pay-out slot (tape supply port; to be described hereinafter) toward a tape ejecting slot 9; and a second feed passage 20b which is branched at substantially right angles from the first feed passage 20a and is communicated with a tape housing (or containing) portion 61 (see FIG. 2).

As shown in FIG. 2, the inner apparatus 17 is made up of: a printing unit 21 which is housed inside the cartridge frame 18 and performs printing on the processing tape T; a full-cut unit 22 which is supported by the common supporting frame 19 so as to face the tape feed passage 20 and performs full-cutting on the processing tape T; a cutting unit 23 which is supported by the common supporting frame 19 on a downstream side of the full-cut unit 22 and performs cut-processing on the processing tape T (tape piece); and a control section 97 (see FIG. 5) which performs an overall control of each of these units.

In this cut-processing apparatus 1, the following processes are sequentially performed. Namely, by means of the control of the control section 97, the printing unit 21 performs printing (print-processing) on the processing tape T. Then, by using the full-cut unit 22 and the cutting unit 23, there are performed full-cutting and the cut-processing in sequence, to thereby obtain a tape piece on which is printed a desired character and which is also cut out into a desired shape.

As shown in FIG. 2, the tape cartridge C to be used in this cut-processing apparatus 1 is covered over the entire surface thereof with a cartridge casing 30 and is made up of: a tape reel 31 which has rolled thereabout the processing tape T into a roll; a ribbon pay-out reel 32 around which is wound the ink ribbon R into a roll; and a ribbon take-up reel 33 which takes up the paid out ink ribbon R. The tape cartridge C also has formed therein a through opening 34 into which a printing head 40 of the printing unit 21 is loosely inserted. A platen roller 35 is rotatably disposed in a manner to face this through opening 34.

The processing tape T faces the through opening 34 and its front (or leading) end is pulled out of the cartridge C (into the tape feed passage 20) from a tape pay-out slot (not shown) which is formed near the through opening 34. After being overlapped with the processing tape T at the position of the through opening 34, the ink ribbon R goes round the through opening 34 so as to be taken up by the ribbon take-up reel 33.

The processing tape T is made up by laminating a tape for separated characters Tc for printing thereon characters which are to be later cut out in putting to actual use and a release tape Tp (see FIG. 1). The printed characters can later be cut out of (separated from) the release tape Tp so that they can be adhered to an object of adhesion (or a target object). As the tape cartridge C, there are prepared plural kinds of different background colors and widths of the processing tape T. On the rear surface of the tape cartridge C, there are provided a plurality of identifying holes (not shown) for identifying the cartridges from one another. Once the tape cartridge C is mounted on the tape mounting portion 8, tape identifying sensor 36 (see FIG. 5) disposed on the bottom plate of the cartridge mounting portion 8 detects the kind of the processing tape T housed in the tape cartridge C by means of the array (bit pattern) of the identifying holes formed on the rear surface of the tape cartridge C.

The tape cartridge mounting portion 8 is arranged to be capable of mounting a tape cartridge (not shown) which contains therein a tape for producing labels (also referred to as a label tape). After performing printing on the label tape by means of the cut-processing apparatus 1, the label tape is cut off to thereby obtain a tape piece which can be adhered on an object of adhesion as a label.

A description will now be made about each of the devices of the inner apparatus 17. As shown in FIG. 2, the printing unit 21 performs printing by paying out the processing tape T from the tape cartridge C, and is made up of: a printing head (thermal head) 40; and a printing feed mechanism 41 which feeds the processing tape T along the tape feed passage 20 while paying out the processing tape T from the tape cartridge C.

The printing head 40 is vertically disposed in the cartridge mounting portion 8 in a state of being covered with the head cover. Once the tape cartridge C is mounted on the cartridge mounting portion 8, the printing head 40 is loosely inserted into the through opening 34 of the tape cartridge C. As a result, the printing head 40 lies opposite to the platen roller 35 in a state of sandwiching therebetween the processing tape T and the ink ribbon R which are positioned at the through opening 34. There can thus attain a state in which the processing tape T (tape for separated characters Tc) can be subjected to thermal transfer printing.

The printing feed mechanism 41 is made up of: the platen roller 35 which is disposed in the tape cartridge C; a platen drive shaft 43 which rotates the platen roller 35; a print feed motor 44 which rotates the platen drive shaft 43; and a power transmission mechanism (not shown) which transmits the power of the print feed motor 44 to the platen drive shaft 43 through a gear train (not shown). The platen drive shaft 43 is vertically disposed in the cartridge mounting portion 8 and is brought into engagement with the platen roller 35 of the tape cartridge C mounted on the cartridge mounting portion 8. When the print feed motor 44 is driven, the platen roller 35 is driven through the platen drive shaft 43. As a result, the processing tape T begins to be paid out and the printed processing tape T is sequentially fed out toward the full-cut unit 22 and the cutting unit 23. The rotation control of the print feed motor 44 is made only for the normal direction of rotation, and not for the opposite (reverse) direction of rotation.

With reference to FIG. 2, a description will be made about the full-cut unit 22. The full-cut unit 22 is disposed on a downstream side, as seen in the tape feed direction, of the printing unit 21 and cuts the fed processing tape T in a style of a pair of scissors to thereby obtain a processing tape T (tape piece) of a predetermined (or given) length. The full-cut unit 22 is made up of a full-cutter 50, a full-cut motor 51, and a full-cut driving mechanism 52 which transmits the power of the full-cut motor 51 to the full-cutter 50 to thereby perform the cutting operation (full-cutting).

The cutting unit 23 performs cut-processing to the processing tape T (tape piece) that has been cut off by the full-cut unit 22. This cut-processing is intended to cut only the tape for separated characters Tc but, strictly speaking, the release tape may sometimes be also partly cut (but not completely). As a kind of cutting, so-called half-cutting may also be performed in which only the tape for separated characters Tc is subjected to cutting in the widthwise direction of the tape for separated characters Tc.

As shown in FIG. 2, the cutting unit 23 is made up of: a cutting mechanism 60 which is disposed to face the tape feed passage 20 (first feed passage 20*a*) and performs cut-processing in which only the tape for separated characters Tc is subjected to cut-processing while feeding in the normal and opposite directions along the tape feed passage 20; a tape housing portion 61 which is in communication with the second feed passage 20*b*; a tape housing mechanism 62 which houses the processing tape T so that the rear end of the processing tape T can be pulled in and out in the cut-processing; and a passage shift mechanism 63 which guides the rear end of the full-cut tape T to the second feed passage 20*b*.

In other words, the cutting unit 23 performs cut-processing in the following manner. Namely, the rear end of the full-cut tape T is guided by the passage shift mechanism 63 once to the tape housing mechanism 62, then the processing tape T is fed in the normal and opposite directions by the cutting mechanism 60 between the tape housing mechanism 62 and the tape feed passage 20 to the tape ejecting slot 20, to thereby perform cut-processing.

The cutting mechanism 60 is made up of: the cutting tool (cutter or cutter edge) 64 which faces the first feed passage 20*a* and is disposed on the downstream side of the second feed passage 20*b* and performs cutting-out of the tape for separated characters Tc; a tool carriage 65 which supports the cutting tool 64; a carriage move mechanism 66 which moves back and forth the tool carriage 65 in a direction at right angles to the tape feed direction; a tool lifting mechanism 67 which moves the cutting tool 64 toward and away from the tape for separated characters Tc by lifting the cutting tool 64; and a tape feed mechanism 68 which moves the processing tape T fed from the full-cut unit 22 in normal or reverse direction of feeding along the tape feed passage 20. It is to be noted that the movement of the above-referenced "lifting" in intended to mean not always the movement in the vertical direction but the movement of the cutting tool 64 in the direction between the cut-in position and non-cut-in position (in this example, in the direction between forward and backward movement). The same applies to the examples hereinafter.

The cutting tool 64 is made up of a tool element (or tool part) 70 and a tool element holder 71 which supports the tool element 70 at a front end thereof. The tool carriage 65 detachably supports the cutting tool 64. In a position to correspond to the position of housing the cutting tool 64, the apparatus casing 4 is provided with a tool replacement cover 10 (see FIG. 1) in a manner capable of being opened and closed to facilitate the replacement of the cutting tool 64.

The tool lifting mechanism 67 has a lifting motor 73 which moves, by the driving of the motor through the tool carriage 65, the cutting tool 64 between a cutting position which is the position of cutting out the tape for separated characters Tc and a waiting position which is away from the tape for separated characters Tc.

The tape feed mechanism 68 has a pair of feed rollers 74 which are disposed so as to sandwich the cutting tool 64, and a power supply mechanism. The pair of feed rollers 74 are constituted by a grip roller which is made up of a drive roller 76 connected to a cut feed motor 75, and a driven roller (free roller) 77 which comes into contact with the drive roller 76 through the tape for separated characters Tc and is rotated as a result of rotation of the drive roller 76. The driven roller 77 is rotatably supported by a driven roller supporting frame 78 into which is assembled a retracting mechanism (not shown). The retracting mechanism moves the driven roller 77 between a grip position gripping with the drive roller 76 and a retracted position which is free from gripping. Description will be made hereinafter about the power supply mechanism of the tape feed mechanism 68 and the carriage move mechanism 66.

The cutting mechanism 60 performs cut-processing by driving in a synchronized manner the carriage move mechanism 66, the tool lifting mechanism 67, and the tape feed mechanism 68. In other words, in the cut-processing, the cutting tool 64 is lifted as guided by a lifting guide shaft 69 of the tool lifting mechanism 67. At the same time, by synchronizing the feeding of the processing tape T by the tape feed mechanism 68 in the normal direction and reverse direction with the reciprocating of the cutting tool 64 by the carriage move mechanism 66 in the tape width direction, the tape for separated characters Tc of the processing tape T can be cut out along an outline of the desired character shape.

The tape housing mechanism 62 houses the rear end of the processing tape T in a manner capable of being pulled in and out to prevent the rear end of the processing tape T, to be fed in the normal and opposite direction by the cutting, from interfering with the printing unit 21 (and full-cut unit 22). The tape housing mechanism 62 is made up of: a tape housing portion 61 which is disposed in a position to face the cutting mechanism 60 with the first tape feed passage 20a therebetween and is in communication with the second tape feed passage 20b; a take-up drum 80 which is disposed in the tape housing portion 61 and sequentially takes up (the rear end) of the processing tape T which is fed through the second tape feed passage 20b; a tape urging mechanism 81 which urges the processing tape T fed to the tape housing portion 61 toward the take-up drum 80; and a power mechanism (not shown) which rotates the take-up drum 80 in the take-up direction by using the power of the cut feed motor 75.

The passage shift mechanism 63 is made up of: a passage shift member 82 which shuts off the branch portion of the first tape feed passage 20a toward the second tape feed passage 20b; and a motor-driven moving mechanism (not shown) for the passage shift member which enables the passage shift member 82 to move between the tape feed shift position in which the first tape feed passage 20a is shut off and the standby position in which the first tape feed passage 20a is left open. When the rear end of the processing tape T is fed toward the tape housing mechanism 62 before starting the cut-processing, the moving mechanism for the passage shift member is driven to shift the passage shift member 82 facing the standby position toward the passage shift position, whereby the branch portion of the first tape feed passage 20a is shut off. In this manner, the rear end of the processing tape T which is fed from the first tape feed passage 20a toward the tape housing mechanism 62 is guided to the second tape feed passage 20b. The power of the lifting motor 73 is transmitted also to the moving mechanism for the passage shift member through the power transmission mechanism and, therefore, the shift mechanism for the passage shift member moves the passage shift member 82 in a manner synchronized with the retracting mechanism.

Figure 5:
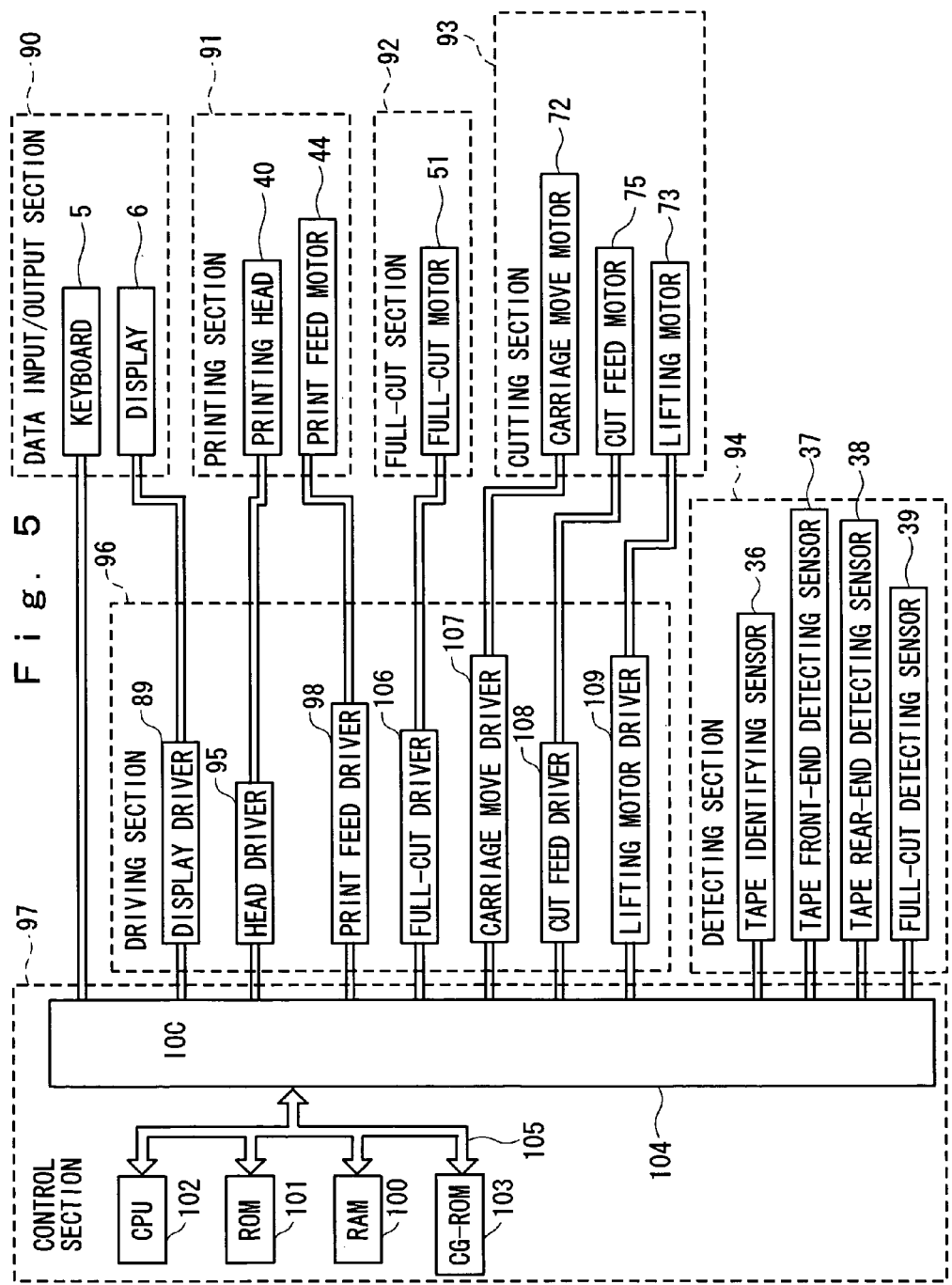
FIG. 5 is a block diagram of the cut-processing apparatus

A description will now be made about the main control system of the cut-processing apparatus 1. As shown in FIG. 5, the cut-processing apparatus 1 is made up of: a data input/output section 90 which has the keyboard 5, the display 6, an external interface (not shown), or the like, and serves as the user interface such as input of character information prepared by an external computer, or the like, display of various information, or the like; a printing section 91 which has the printing head 40 and the print feed motor 44, and performs print-processing on the processing tape T by driving the printing head 40 and the print feed motor 44 in a manner synchronized with each other; a full-cut section 92 which has a full-cut motor 51 and performs full-cutting on the processing tape T that has been printed; a cutting section 93 which has the lifting motor 73, the cut feed motor 75, a carriage move motor 72 and causes the full-cutting to be performed on the processing tape T by driving the above-referenced motors; a detecting section 94 which has various sensors such as the tape identifying sensor 36, the tape front-end detecting sensor 37, a tape rear-end detecting sensor 38, a full-cut detecting sensor 39, or the like, for performing various detections; a driving section 96 which has a head driver 95 for driving the printing head 40, a display driver 89 for driving the display 6, a print feed driver 98 for driving the print feed motor 44, a full-cut driver 106 for driving the full-cut motor 51, a carriage move driver 107 for driving the carriage move motor 72, a cut feed driver 108 for driving the cut feed motor 75, and a lifting motor driver 109 for driving the lifting motor 73; and a control section 97 which performs control over the whole of the cut-processing apparatus 1.

The control section 97 is made up of: a RAM 100 which has a memory region capable of temporary storing and is used as a working region for control processing; a ROM 101 which has various memory regions for storing control program and control data (color conversion table, character decoration table, or the like); a CG-ROM 103 which stores font data such as characters, signs, figures, or the like, and font data and figure data for cut-out shape, and outputs print image (dots) information corresponding to the code data when the code data to identify the characters, or the like is given; a CPU 102 which computes the various data; an input/output apparatus (input-output controller, IOC) 104 which has assembled therein a logic circuit for handling the interface signals with the peripheral circuits; and a bus 105 which interconnects the above together.

The control section 97 performs compute-processing of the various data inputted into the ROM 101 from the various portions through the IOC 104, according to the control program, or the like stored in the ROM 101. By thus outputting the result of the compute-processing (control signals) to various drivers through the IOC 104, each portion is controlled.

As a result of this control, various processing can be performed onto the processing tape T. For example, only the print-processing can be performed on the tape for separated characters Tc for printing thereon characters, and both the print-processing of tape for separated characters Tc and the cut-processing can also be performed. In addition, without performing print-processing on the tape for separated characters Tc, only the cut-processing can also be performed.

A description will now be made about a series of processing operations of the cut-processing apparatus 1 with reference to FIGS. 1 and 2. When the tape cartridge C is mounted on the cartridge mounting portion 8 and the power switch (not shown) on the keyboard 5 of the cut-processing apparatus 1 is switched on, the kind (tape width) of the processing tape T is detected by the tape identifying sensor 36. On the other hand, as a result of driving of the carriage move motor 72, the tool carriage 65 is moved from the home position to the switching position so as to be in standby. As a result, a switching gear (not shown) is switched to the engaging position, and the retracting mechanism is ready for operation.

Here, the cut feed motor 75 rotates in the reverse direction of rotation by a predetermined (or given) number of steps so that a pair of tape width guides (not shown) can be set in position to suit the tape width. Further, the lifting motor 73 is driven, and the driven roller 77 is moved to the retracting position (initial state).

If the character is selected by the operation of the keyboard 5 in this initial state, the printing image (dot) information corresponding to the designated code data is read out of the CG-ROM 103, to thereby produce the control data which controls the movements of the lifting motor 73, the cut feed motor 75 and the carriage move motor 72 (details will be given hereinafter). In this manner, the processing of tape for separated characters Tc by the cut-processing apparatus 1 is started. Further, it is also possible to input the character print image (dot) information produced by an outside computer, or the like, or the outline information into the cut-processing apparatus 1.

First, when the print feed motor 44 starts driving, the platen roller 35, or the like rotates and, as a result, the processing tape T is paid out of the tape cartridge C and, in a manner synchronized therewith, the printing head 40 is driven to generate heat, thereby performing printing of image on the tape for separated characters Tc. At this time, in a manner synchronized with the print feed motor 44, the cut feed motor 75 is also rotated in the normal direction of rotation, whereby the tape feeding on the downstream side of the first tape feed passage 20a is assisted by the feed roller 74.

When the tape front-end detecting sensor 37 detects the front end of the processing tape T, and the printing based on the printing data is finished, the cut feed motor 75 and the carriage move motor 72 are rotated in the normal direction of rotation by the number of required steps (predetermined dimension), to thereby feed the processing tape T in the tape feed direction by a distance between the printing head 40 and the full-cutter 50. The print feed motor 44 and the cut feed motor 75 are thus brought to a suspended state. Here, the lifting motor 73 is rotated in the reverse direction of rotation and the driven roller 77 of the feed roller 74 is moved to the gripped position. As a result, the processing tape T is held on the downstream side by the pair of feed rollers 74, and on the upstream side by the printing head 40 and the platen roller 35, with the full-cutter 50 being sandwiched therebetween.

Then, when the full-cut motor 51 starts driving, the full-cutter 50 performs full-cutting of the processing tape T, thereby cutting it off. Once the full-cut detecting sensor 39 has detected that the full-cutting has been finished, the driving of the full-cut motor 51 is stopped.

When the carriage move motor 72 starts driving after full-cutting, the tool carriage 65 moves to the home position. As a result, a switching gear (not shown) is switched to the pushed-in position, and the retracting mechanism is no more operable. In other words, irrespective of the normal or reverse direction of rotation of the cut feed motor 75 and the normal or reverse direction of rotation of the lifting motor 73 in the subsequent half-cutting, the state of setting of the tape width guide (not shown) is maintained, and the gripping position of the driven roller 77 is maintained.

Subsequently, the cut feed motor 75 is rotated in the normal direction of rotation by a predetermined number of steps, and the rear end of the cut-off processing tape T (the tape piece that has been printed) reaches the position of the feed roller 74 (74a), i.e., the position beyond the branch point to the second feed passage 20b. Then, the cut feed motor 75 rotates in the reverse direction of rotation, the processing tape T shifts its passage to thereby travel along the second feed passage 20b, and the rear end thereof is detected by the tape rear-end detecting sensor 38. Thereafter, the rear end of the processing tape T is fed to the tape housing portion 61, and the front end thereof is detected by the tape front-end detecting sensor 37. The control section 97 computes the length of the processing tape T to thereby perform positional correction of the cutting-out data.

Here, the cut feed motor 75 rotates in the normal or reverse direction of rotation for several times to thereby perform blank feeding of moving the processing tape T back and forth along the second tape feed passage 20b. When the processing tape T in a state of being set in position thus becomes well fit into the tape width guide (not shown), the half-cutting operation by the cutting tool 64 starts. In the half-cutting operation, the carriage move motor 72 is rotated in normal or reverse direction of rotation in a manner synchronized with the driving of the cut feed motor 75 in the normal or reverse direction of rotation, and also the lifting motor 73 is rotated in the normal direction of rotation.

As a result, there is performed half-cutting into cut-out shape of the processing tape T in a manner synchronizing the feeding of the processing tape T in the normal or reverse direction by the tape feed mechanism 68, the back and forth movement of the cutting tool 64 by the carriage move mechanism 66, and the up and down movement (i.e., the movement between the cut-processing position and the non-cut-processing position) of the cutting tool 64 by the tool lifting mechanism 67. After the half-cutting has been finished, the cut feed motor 75 is rotated in the normal direction of rotation, whereby the processing tape T is ejected out of the tape ejecting slot 9 to the outside of the apparatus.

Figure 3:
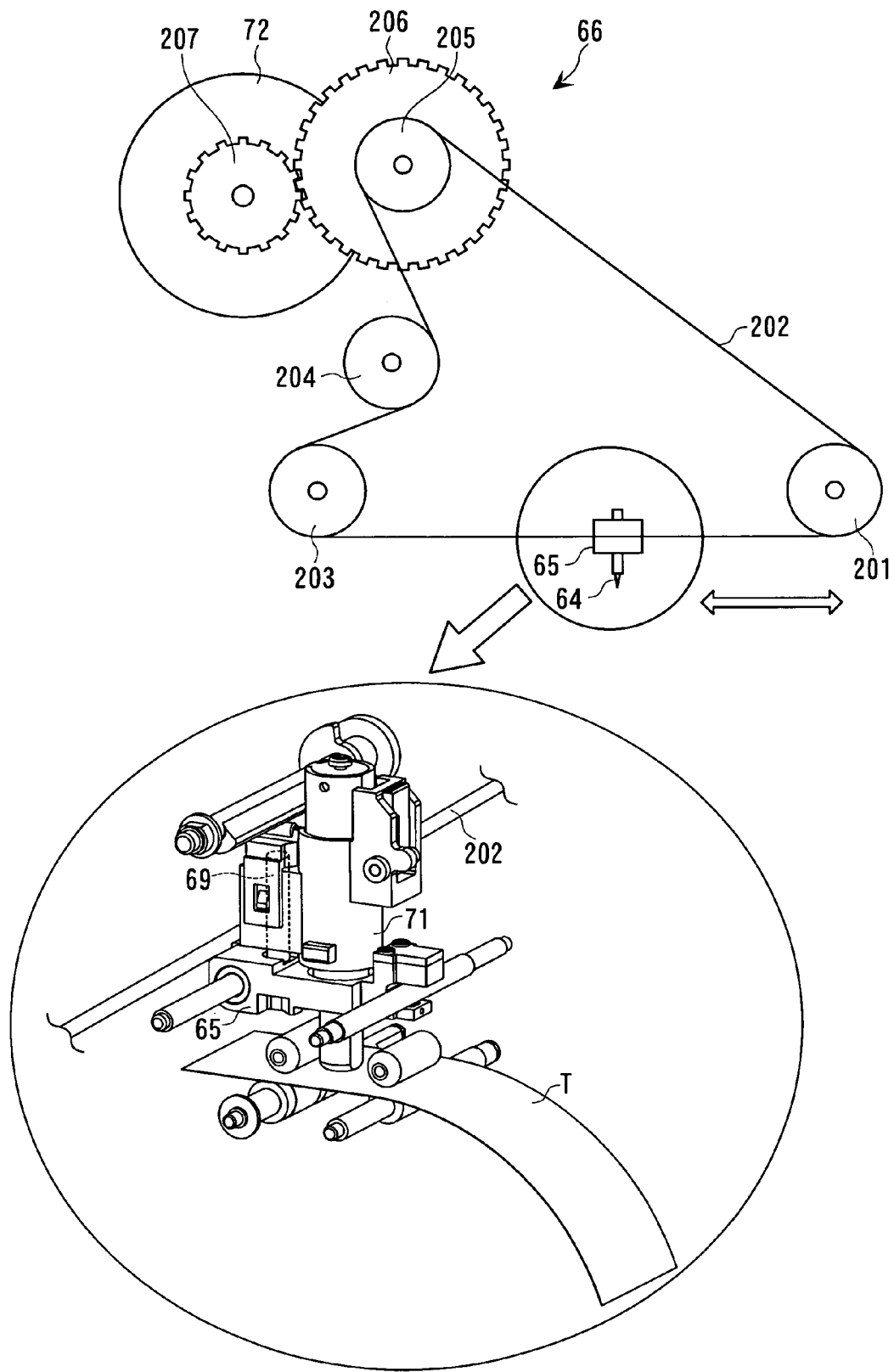
FIG. 3 is a schematic diagram of a carriage move mechanism.

A description will now be made about the power supply mechanism of the carriage move mechanism 66 and the tape feed mechanism 68. As shown in FIG. 3, the carriage move mechanism 66 is made up of: a carriage move motor 72 which serves as the driving power for moving the cutting tool 64 through the tool carriage 65; a carriage drive gear 207 which is mounted on the drive shaft of the carriage move motor 72 and inputs the power from the carriage move motor 72 to a carriage main gear 206; the carriage main gear 206 which inputs the power from the carriage main gear 207 to a carriage main pulley 205; the carriage main pulley 205 which shares a common rotary shaft with the carriage main gear 206 and inputs, with speed reduction, from the carriage main gear 206 to a timing belt 202; the timing belt 202 which transmits power to each pulley; the tool carriage 65 which is supported by a guide shaft (not shown) parallel with the timing belt 202 and moves back and forth together with the timing belt 202; the cutting tool 64 which is held by the tool carriage 65; a first driven pulley 201 which is driven through the timing belt 202 and is disposed on the left end of the moving region in which the tool carriage 65 moves back and forth; a second driven pulley 203 which is driven through the timing belt 202 and is disposed on the right end of the moving region in which the tool carriage 65 moves back and forth; and a tension roller 204 which adjusts the tension of the carriage timing belt 202.

In other words, the carriage move mechanism 66 has a function of transmitting the power of the carriage move motor 72 through the gear train, each pulley and the timing belt 202. In addition, by the rotation of the carriage move motor 72 in the normal or reverse direction of rotation, the tool carriage 65 that is fixed to the timing belt 202 moves the reciprocating region (the region of back and forth movement) between the first driven pulley 201 and the second driven pulley 203. As a result, there is performed the cut-processing in the widthwise direction of the tape by the cutting tool 64 held by the tool carriage 65 relative to the processing tape T. In the following description about the back and forth movement of the tool carriage 65, the following definition is made. Namely, the movement from the first driven pulley 201 side to the second driven pulley 203 side is defined as the forward movement (to move forth), and the movement from the second driven pulley 203 side to the first driven pulley 201 side is defined as the backward movement (to move back). It is needless to say that the range of back and forth movement is greater than the maximum tape width.

Figure 4:
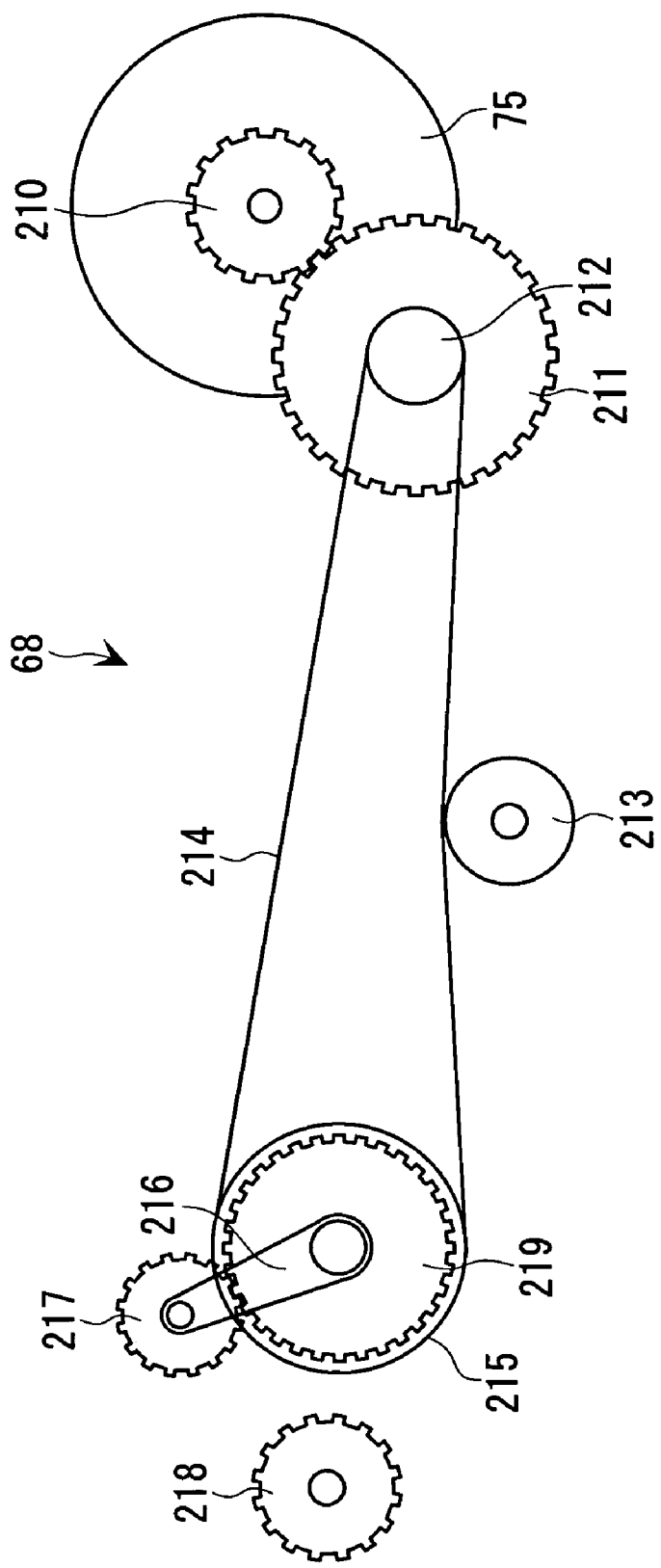
FIG. 4 is a schematic diagram of a tape feed mechanism.

As shown in FIG. 4, the power supply mechanism of the tape feed mechanism 68 is made up of: the cut feed motor 75 which serves as the power source for rotating the feed roller 74*a* (see FIG. 2) which is disposed on the rotary shaft of the first gear 219 and the feed roller 74*b* (see FIG. 2) which is disposed on the rotary shaft of the second gear 218; a drive gear 210 which is mounted on the drive shaft of the cut feed motor 75 and inputs the power from the cut feed motor 75 to a main drive gear 211 after speed reduction; the main drive gear 211 which inputs the power from the drive gear 210 to a main drive pulley 212; the main drive pulley 212 which shares a common rotary shaft with the main drive gear 211 and inputs the power from the main drive gear 211 to the timing belt 214; the first pulley 215 which inputs power from the timing belt 214; the feed roller 74*a* which is disposed on a rotary shaft extended from a common rotary shaft as the first pulley; a first gear 219 which commonly shares the rotary shaft with the first pulley 215 and inputs power to a clutch gear 217 constituting a clutch 216; a second gear 218 which transmits power through the clutch gear 217; and the feed roller 74*b* which shares the common rotary shaft with the second gear 218 and serves as a sub-roller disposed on the extended rotary shaft.

In other words, when the cut feed motor 75 is rotated in the normal direction of rotation, the tape feed mechanism 68 transmits the power to the main roller (feed roller 74*a*) and the sub-roller (feed roller 74*b*) through the drive gear 210, the main drive gear 211, the main drive pulley 212, the timing belt 214, the first pulley 215, the first gear 219, the clutch gear 217, and the second gear 218, thereby feeding the processing tape T in the forward direction. When the cut feed motor 75 is rotated in the reverse direction of rotation, the power is transmitted to the main roller (feed roller 74*a*) through the cut-processing drive gear 210, the main drive gear 211, the timing belt 214, and the first pulley 215, thereby feeding the processing tape T in the reverse direction. The feeding of the processing tape T in the normal or reverse direction is mainly handled by the main roller (feed roller 74*a*).

A description will now be made about a move loss of the carriage move mechanism 66 and a feed loss of the tape feed mechanism 68. The carriage move mechanism 66 gives rise to the occurrence of the move loss due to the rotation of the carriage move motor 72 in the normal or reverse direction of rotation. This loss includes a move loss in backlash which is a play in the gear train between the carriage drive gear 207 and the carriage main gear 206, and a move loss in pseudo-backlash (i.e., a loss which is similar to the loss in backlash) between each of the pulleys and the timing belt 202 at the time of normal or reverse rotation. These losses are described by referring them as carriage move backlash crb.

In addition, accompanied by the back and forth movement of the cutting tool 64 during the cut-processing (when the cutting tool 64 is in contact with the processing tape T), there will occur a move loss as a result of deformation of constituting members in the direction of movement of the carriage due to the cutting resistance between the processing tape T and the cutting tool 64. In concrete, there can be listed the torsion of the lifting guide shaft 69, twisting of the tool holder 71 (see FIGS. 2 and 3), clattering (error in tolerance) between each of the bearing portion, rotating portion, or the like.

These move losses are described as carriage movement deformation backlash chb. The carriage movement deformation backlash chb differs in the amount of loss depending on the forward movement or the backward movement of the cutting tool 64 due to the fact that the cutting tool 64 and therearound are not constituted in a symmetrical manner. Therefore, in this embodiment, the carriage movement deformation backlash chb at the time of forward movement of the cutting tool 64 is defined as chb (1), and the carriage movement deformation backlash chb at the time of backward movement of the cutting tool 64 is defined as chb (0), whereby the two are separately defined.

On the other hand, the tape feed mechanism 68 gives rise to a feed loss due to the rotation of the cut feed motor 75 in the normal or reverse direction of rotation. This loss includes a feed loss in backlash which is a play in the gear train between the drive gear 210 and the main drive gear 211, and a feed loss in pseudo-backlash (i.e., a loss which is similar to the loss in backlash) between each of the pulleys and the timing belt 214. This amount of feed loss is described by referring it as a tape feed backlash grb.

In addition, accompanied by the feeding in the normal direction or reverse direction of the processing tape T during the cut-processing (when the cutting tool 64 is in contact with the processing tape T), there will occur a feed loss as a result of deformation of constituting members in the direction of movement of the processing tape due to the cutting resistance between the processing tape T and the cutting tool 64. In concrete, there can be listed the torsion of the lifting guide shaft 69, twisting of the tool carriage 65 (see FIGS. 2 and 3), clattering (error in tolerance) between each of the bearing portion, rotating portion, or the like. A description will be made hereinafter by referring the feed loss as the tape feed deformation backlash ghb. The tape feed deformation backlash ghb differs in the amount of loss depending on the normal or reverse rotation of the cut feed motor 75, i.e., the difference in the direction of rotation of tape feeding, due to the fact that the cutting tool 64 and therearound are not constituted in a symmetrical manner. Therefore, in this embodiment, the tape feed deformation backlash ghb at the time of tape feeding in the normal direction is defined as ghb (1), and the carriage movement deformation backlash chb at the time of tape feed deformation backlash ghb at the time of feeding in the reverse direction is defined as ghb (0), whereby the two are separately defined.

The above-referenced move loss and the feed loss become factors of errors in the cut-processing of the processing tape T. Therefore, in the cut-processing apparatus 1 of this embodiment, after having produced the control data for controlling the carriage move mechanism 66 and the tape feed mechanism 68, the errors due to the above-referenced move loss and the feed loss are compensated for or supplemented, thereby correcting the control data. A description will now be made about the processing control for correcting the control data.

First, with reference to FIGS. 6 to 9, a description will be made about the measurement of the amount of loss in the move loss (carriage movement backlash crb, carriage movement deformation backlash chb (1), chb (0)) and the feed loss (tape feed backlash grb, tape feed deformation backlash ghb (1), ghb (0)).

Figure 6:
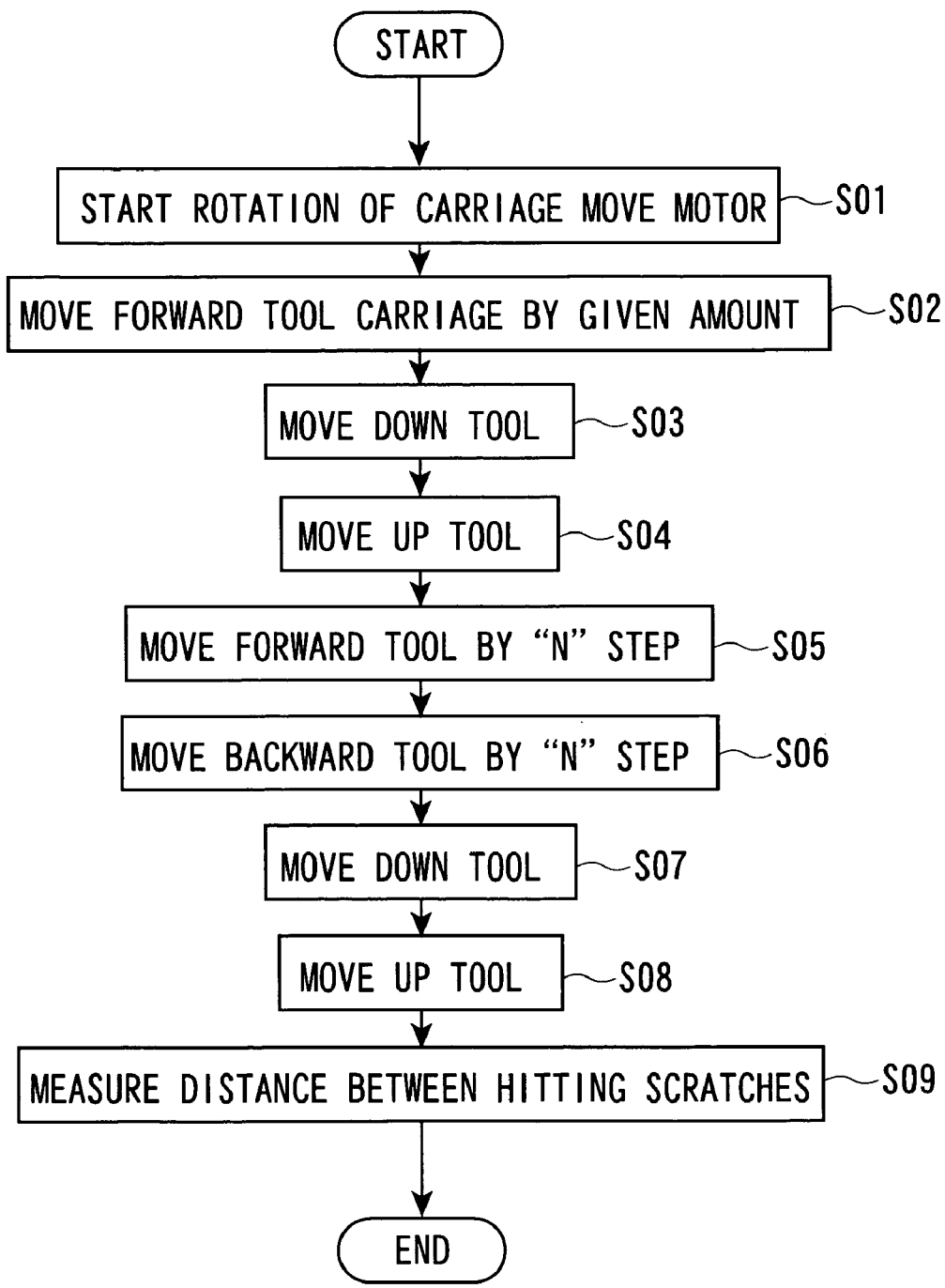
FIG. 6 is a flow chart showing the measurement of backlash in carriage movement.

FIG. 6 is a flow chart showing the measuring procedure of the carriage move backlash crb at the time of forward movement of the tool carriage 65. As shown in FIG. 6, the cut-processing apparatus 1 first starts the normal rotation of the carriage move motor 72 (S01) and moves forward the tool carriage 65 by a predetermined amount (S02). This processing is to prevent the carriage movement backlash crb from occurring at the stage before measurement. Then, the cutting tool 64 is moved down to bring it into contact with the processing tape T (cut-in position) (S03), and the cutting tool 64 is moved up to thereby bring it out of contact with the processing tape T (non-cut-in position) (S04). Then, the tool carriage 65 is moved forward by "n" step (S05), and the tool carriage 65 is moved backward by "n" step (S06). Then, the cutting tool 64 is again moved down to bring it into contact with the processing tape T (S07), and the cutting tool 64 is moved up to bring it out of contact with the processing tape T (S08). Finally, the distance is measured between hitting scratches (or scars) of the cutting tool 64 (S09). As a result of the above processing, the distance between the measured hitting scratches can be obtained as the amount of move loss of the carriage movement backlash crb. The backlash crb at the time of backward movement of the tool carriage 65 is the same as that at the time of forward movement.

Figure 7:
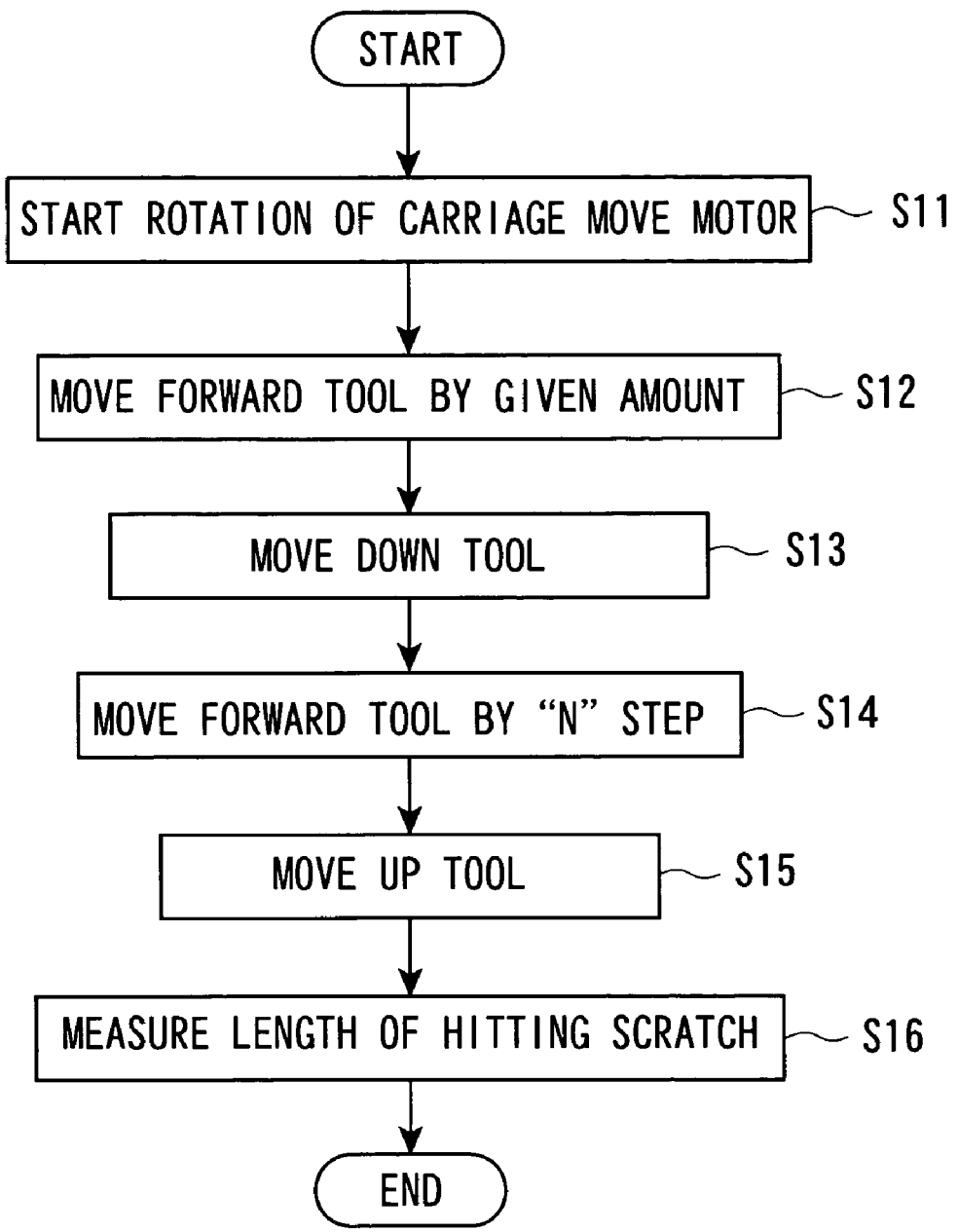
FIG. 7 is a flow chart showing the measurement of a carriage movement deformation backlash.

FIG. 7 is a flow chart showing the measuring procedure of the carriage movement deformation backlash chb (1) at the time of forward movement of the tool carriage 65. As shown in FIG. 7, the cut-processing apparatus 1 first starts the normal rotation of the carriage move motor 72 (S11) and moves forward the tool carriage 65 by a predetermined amount (S12). This processing is to prevent the carriage movement deformation backlash crb (1) from occurring at the stage before measurement. Then, the cutting tool 64 is moved down to bring it into contact with the processing tape T (S13), and the tool carriage 65 is moved forward by "n" step (S14). Then, the cutting tool 64 is moved up to bring it into non-contact state with the processing tape T.

Finally, the length of the hitting scratches of the cutting tool 64 is measured (S16). As a result of the above processing, from the theoretical length of hitting scratches at the time of forward movement by "n" step of the tool carriage 65, the difference in the measured hitting scratches can be obtained as the amount of move loss of the carriage movement deformation backlash chb (1). The carriage movement deformation backlash chb (0) which occurs at the time of backward movement of the tool carriage 65 can be measured by the above procedure by reversing the direction of rotation of the carriage move motor 72.

Figure 8:
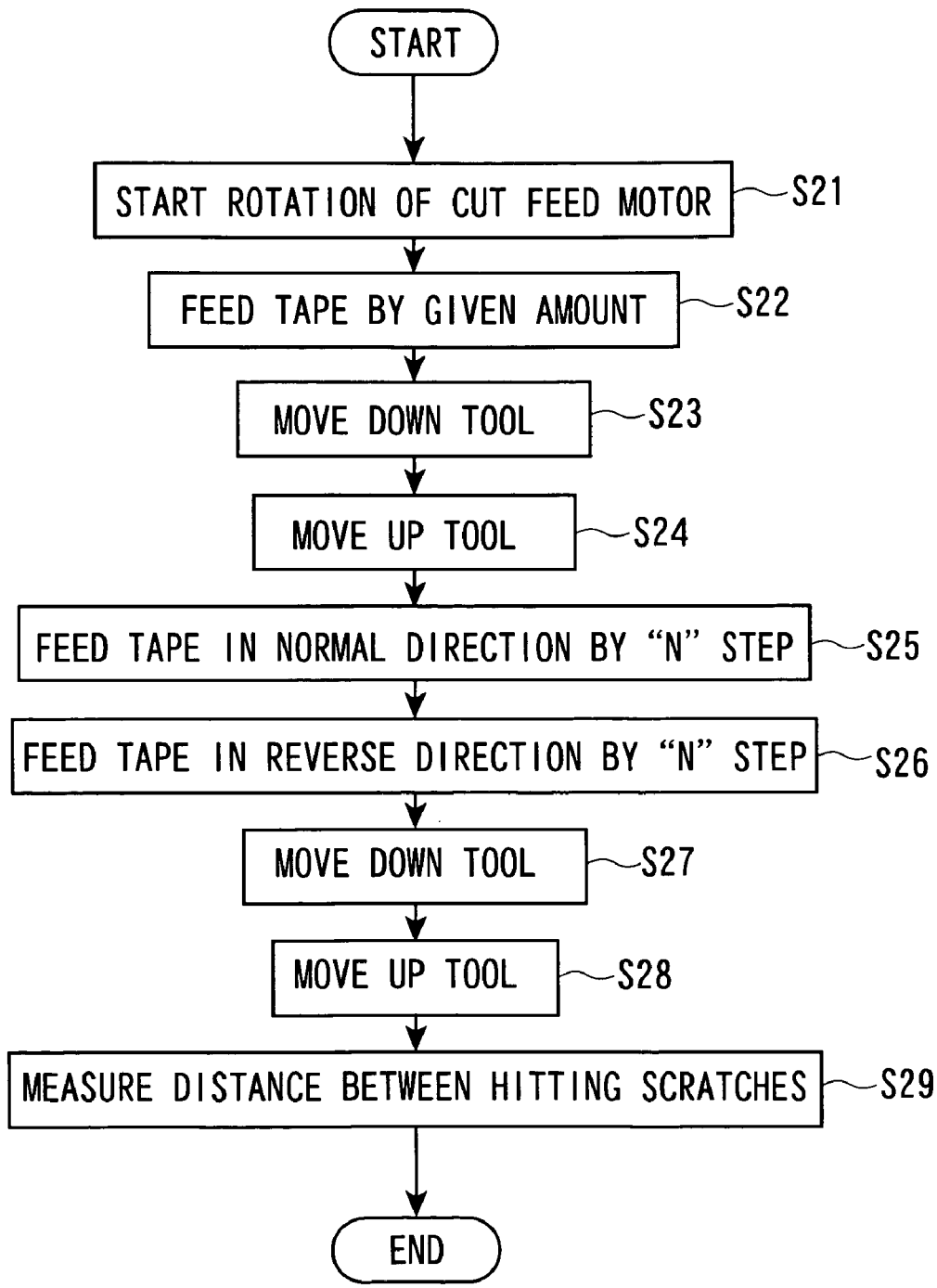
FIG. 8 is a flow chart showing the measurement of a tape feed backlash.

On the other hand, FIG. 8 is a flow chart showing the measuring procedure of the tape feed backlash grb. As shown in FIG. 8, the cut-processing apparatus 1 first starts the normal rotation of the cut feed motor 75 (S21) and performs forward tape feeding by a predetermined amount (S22). This processing is to prevent the tape feed backlash grb from occurring at the stage before measurement. Then, the cutting tool 64 is moved down to bring it into contact with the processing tape T (cut-in position) (S23), and the cutting tool 64 is moved up to thereby bring it out of contact with the processing tape T (non-cut-in position) (S24). Then, the tape feeding in the normal direction is performed by "n" step (S25), and the tape feeding in the reverse direction is performed by "n" step (S26). Then, the cutting tool 64 is again moved down to bring it into contact with the processing tape T (S27), and the cutting tool 64 is moved up to bring it out of contact with the processing tape T (S28). Finally, the distance is measured between hitting scratches of the cutting tool 64 (S29). As a result of the above processing, the distance between the measured hitting scratches can be obtained as the amount of feed loss due to the tape feed backlash grb. The amount of feed loss due to the tape feed backlash grb becomes the same when it is obtained by starting the measurement with the reverse rotation of the cut feed motor 75.

Figure 9:
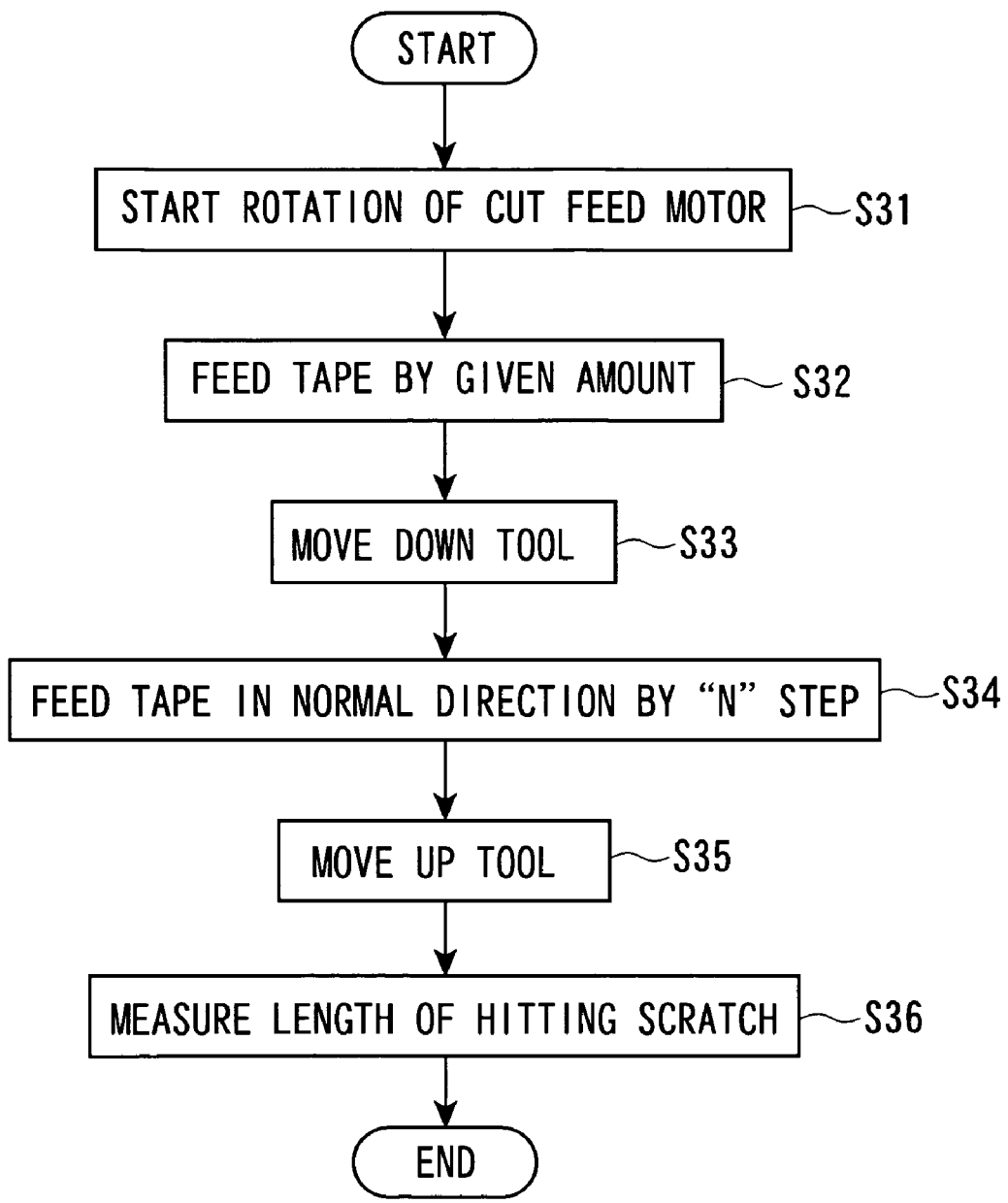
FIG. 9 is a flow chart showing the measurement of a tape feed deformation backlash.

FIG. 9 is a flow chart showing the procedure of measuring the tape feed deformation backlash ghb (1) which occurs at the time of feeding the tape in the normal direction. As shown in FIG. 9, the cut-processing apparatus 1 first starts the normal rotation of the cut feed motor 75 (S31) to thereby perform the tape feeding by a predetermined amount in the normal direction (S32). This processing is performed to prevent the tape feed deformation backlash ghb (1) from occurring at a stage before measuring. Then, the cutting tool 64 is moved down to bring it into contact with the processing tape T (S33) and the tape feeding is performed by "n" step in the normal direction (S34). Thereafter, the cutting tool 64 is moved up to bring it out of contact with the processing tape T (S35).

Finally, the length of the hitting scratches is measured (S34). As a result of the above processing, the difference in length of the measured hitting scratches can be obtained as the amount of move loss due to the deformation backlash ghb (1) from the theoretical length of the hitting scratches when the tape feeing is made by "n" step. Regarding the tape feed deformation backlash ghb (0) which occurs at the time of tape feeding in the reverse direction, the direction of rotation of the cut feed motor 75 is reversed to thereby perform measurement in the above procedure. In the measurement of the amount of loss, it is preferable to use the cutting tool 64 which has a needle-like front end.

Figure 10:
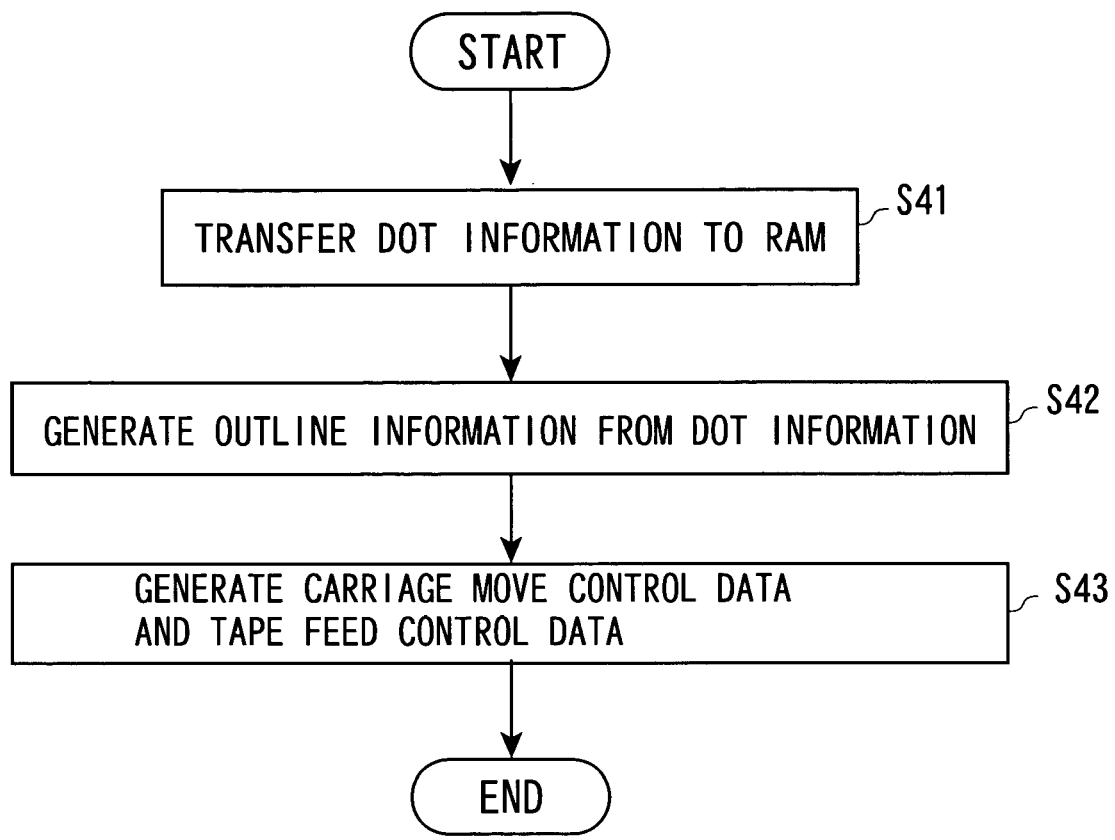
FIG. 10 is a flow chart showing the processing of producing cutting control data.

With reference to the flow chart in FIG. 10, a description will be made about the procedure of producing control data for controlling the carriage move mechanism 66 and the tape feed mechanism 68 by the cut-processing apparatus 1. The cut-processing apparatus 1 first reads the print image (dot) information of the designated characters, shape, or the like from the CG-ROM 103 by a given operation, or the like, of the keyboard 5 and transfers it to the RAM 100 (S41). Alternatively, the print image (dot) information of characters, shape, or the like as produced by the outside computer, or the like is transferred to the cut-processing apparatus 1 and transfers it to the RAM 100 through the IOC 104. Then, an outline information is generated from the print image (dot) information (S42). Further, based on the generated outline information, carriage move control data for controlling the carriage move mechanism 66 and the tape feed control data for controlling the tape feed mechanism 68 are generated and stored in the RAM 100 as the control data (S43).

The carriage move control data includes the amount of movement of the tool carriage 65, the direction of rotation of the carriage move motor 72 in the normal or reverse direction, the state of moving up or down of the cutting tool 64, or the like. It is generated as data array for each step. The tape feed control data includes the number of feeding steps of the processing tape T, the direction of normal or reverse direction of rotation of the cut feed motor 75, the state of moving up or down of the cutting tool 64, or the like, and is generated as a data array for each step. In case the outline information is inputted from the outside computer, or the like of the cut-processing apparatus 1, the outline information is stored in the RAM 100, and the above-referenced carriage move control data and the sheet feed control data are generated and stored in the RAM 100.

A description will now be made about the correction data to be newly inserted as the correction of the generated control data. The cut-processing apparatus 1 according to this embodiment stores in the ROM 101 the correction data for compensating the amounts of loss based on each amount of loss as measured by the above-referenced procedure. The correction data is generated depending on the move loss of the carriage move mechanism 66 and the feed loss of the tape feed mechanism 68, and plural kinds are stored depending on the combinations of the direction of rotation of the carriage move motor 72 or the cut feed motor 75, and the moved up or down state of the cutting tool 64 (time of start or end of cutting-in). A description will now be made about each of them.

FIGS. 11A and 11B show carriage move correction data for correcting the carriage move control data. The carriage move correction data can be classed into two kinds, i.e.: return correction data (see FIG. 11A) for correcting the move loss, in a state in which the cutting tool 64 is stationary in the vertical direction, the move loss being generated as a result of normal or reverse direction of rotation of the carriage move motor 72; and cutting tool motion correction data (see FIG. 11B) for correcting the move loss to be generated as a result of up and down motion of the cutting tool 64.

First, a description will be made about the return correction data (see FIG. 11A). The return correction data can be further divided into: a correction data when the cutting tool 64 is in a moved-up state (i.e., in a state in which it is out of contact with the processing tape T); and a correction data when the cutting tool 64 is in a moved-down state (i.e., in a state in which it is in contact with the processing tape T). When the carriage move motor 72 is rotated from normal direction of rotation to the reverse direction of rotation (at the time of switching from the forward movement to the backward movement of the cutting tool 64) in a state in which the cutting tool 64 is in a moved-up state (out of contact with the processing tape T), the amount of move loss of the carriage move backlash crb is compensated for in the reverse direction (i.e., in the backward moving direction of the cutting tool 64) (see FIG. 11A, No. 1). When the carriage move motor 72 is rotated from the reverse direction of rotation to the normal direction of rotation (at the time of switching from the backward movement to the forward movement), the amount of move loss of the carriage move backlash crb is compensated for in the normal direction (i.e., in the forward direction of the cutting tool 64) (see FIG. 11A, No. 2).

On the other hand, when the carriage move motor 72 is rotated from the normal direction of rotation to the reverse direction of rotation in a state in which the cutting tool 64 is in a moved-down state (in contact with the processing tape T), the amount of move loss of the carriage move backlash crb, the carriage move deformation backlash chb (1), and the carriage move deformation backlash chb (0) is compensated for in the reverse direction (i.e., in the backward direction of the cutting tool 64) (see FIG. 11A, No. 3). Similarly, when the carriage move motor 72 is rotated from the reverse direction of rotation to the normal direction of rotation, the amount of move loss of the carriage move backlash crb, the carriage move deformation backlash chb (0), and the carriage move deformation backlash chb (1) is compensated for in the normal direction (i.e., in the forward direction of the cutting tool 64) (see FIG. 11A, No. 4). The compensation of the carriage move deformation backlash chb (1) at No. 3 and the compensation of the carriage move deformation backlash chb (0) are to align the return of the deformation and the position in terms of data because the deformation of the cutting tool 64 will return to the original state at the time of shift of direction.

A description will be made about the cutting tool motion correction data (see FIG. 11B). The cutting tool motion correction data can be further divided into: a correction data when the cutting tool 64 shifts from the moved-up state (i.e., in a state in which it is out of contact with the processing tape T) to the moved-down state (i.e., in a state in which it is in contact with the processing tape T); and a correction data when the cutting tool 64 shifts from the moved-down state to the moved-up state (at the time of finishing of the cutting in).

A description will be made first about the correction data when the cutting tool 64 shifts from the moved-up state to the moved-down state. In case the carriage move motor 72 continues to rotate in the normal direction of rotation when the direction of rotation of the carriage move motor 72 does not shift before and after the shift of the cutting tool 64, the amount equivalent to the move loss of the carriage move deformation backlash chb (1) is compensated for in the normal direction (i.e., forward direction of the cutting tool 64) (see FIG. 11B, No. 1). In case the carriage move motor 72 continues to rotate in the reverse direction, the amount equivalent to the move loss of the carriage move deformation backlash chb (0) is compensated for in the reverse direction (i.e., backward direction of the cutting tool 64) (see FIG. 11B, No. 2).

In case the carriage move motor 72 rotates from the normal direction of rotation to the reverse direction of rotation when the direction of rotation of the carriage move motor 72 shifts before and after the shift of the cutting tool 64, the amount equivalent to the move loss of the carriage move backlash crb and the carriage move deformation backlash chb (0) is compensated for in the reverse direction (i.e., backward direction of the cutting tool 64) (see FIG. 11B, No. 3). In case the carriage move motor 72 rotates from the reverse direction of rotation to the normal direction of rotation, the amount equivalent to the move loss of the carriage move backlash crb and the carriage move deformation backlash chb (1) is compensated for in the normal direction (i.e., forward direction of the cutting tool 64) (see FIG. 11B, No. 4).

A description will be made about the correction data when the cutting tool 64 shifts from the moved-down state to the moved-up state. In case the carriage move motor 72 continues to rotate in the normal direction of rotation when the direction of rotation of the carriage move motor 72 does not shift before and after the shift of the cutting tool 64, the amount equivalent to the move loss of the carriage move deformation backlash chb (1) is compensated for in the reverse direction (i.e., backward direction of the cutting tool 64) (see FIG. 11B, No. 5). In case the carriage move motor 72 continues to rotate in the reverse direction of rotation, the amount equivalent to the move loss of the carriage move deformation backlash chb (0) is compensated for in the normal direction (i.e., forward direction of the cutting tool 64) (see FIG. 11B, No. 6).

In case the carriage move motor 72 rotates from the normal direction of rotation to the reverse direction of rotation when the direction of rotation of the carriage move motor 72 shifts before and after the shift of the cutting tool 64, the amount equivalent to the move loss of the carriage move backlash crb and the carriage move deformation backlash chb (1) is compensated for in the reverse direction (i.e., backward direction of the cutting tool 64) (see FIG. 11B, No. 7). In case the carriage move motor 72 rotates from the reverse direction of rotation to the normal direction of rotation, the amount equivalent to the move loss of the carriage move backlash crb and the carriage move deformation backlash chb (0) is compensated for in the normal direction (i.e., forward direction of the cutting tool 64) (see FIG. 11B, No. 8). The compensation of the carriage move deformation backlash chb at Nos. 5 to 8 shown in FIG. 11B is to align the return of the deformation and the position in terms of data because the deformation of the cutting tool 64 will return to the original state at the time of shift of direction from the moved-down state to the moved-up state of the cutting tool 64.

FIGS. 12A and 12B show tape feed correction data for correcting the tape feed control data. The tape feed correction data can be classed into two kinds, i.e.: return correction data (see FIG. 12A) for correcting the feed loss to be generated, in a state in which the cutting tool 64 is stationary in the vertical direction, with normal or reverse direction of rotation of the cut feed motor 75 serving as a trigger; and cutting tool motion correction data (see FIG. 12B) for correcting the feed loss to be generated as a result of up and down motion of the cutting tool 64.

First, a description will be made about the return correction data (see FIG. 12A). The return correction data can be further divided into: a correction data when the cutting tool 64 is in a moved-up state (i.e., in a state in which it is out of contact with the processing tape T); and a correction data when the cutting tool 64 is in a moved-down state (i.e., in a state in which it is in contact with the processing tape T). When the cut feed motor 75 is rotated from the normal direction of rotation to the reverse direction of rotation (at the time of switching from the feeding in the normal direction to the feeding in the reverse direction) in a state in which the cutting tool 64 is in a moved-up state (out of contact with the processing tape T), the amount of feed loss of the tape feed backlash grb is compensated for in the reverse direction (i.e., in the direction opposite to the direction of the tape feeding)(see FIG. 12A; No. 1). When the cut feed motor 75 is rotated from the reverse direction of rotation to the normal direction of rotation (at the time of switching from the backward feeding to the forward feeding), the amount of feed loss of the tape feeing backlash grb is compensated for in the normal direction (i.e., in the normal direction of the tape feeding) (see FIG. 12A, No. 2).

On the other hand, when the cutter feed motor 72 is rotated from the normal direction of rotation to the reverse direction of rotation in a state in which the cutting tool 64 is in a moved-down state (in contact with the processing tape T), the amount of move loss of the tape feed backlash grb, the tape feed deformation backlash ghb (1), and the tape feed deformation backlash ghb (0) is compensated for in the reverse direction (i.e., in the direction opposite to the tape feeding)(see FIG. 12A, No. 3). When the cut feed motor 75 is rotated from the reverse direction of rotation to the normal direction of rotation, the amount of feed loss of the tape feed backlash grb, the tape feed deformation backlash ghb (0), and the tape feed deformation backlash ghb (1) is compensated for in the normal direction (i.e., in the normal direction of the tape feeding) (see FIG. 12A, No. 4). The compensation of the tape feed deformation backlash ghb (1) at No. 3 and the compensation of the tape feed deformation backlash ghb (0) at No. 4 are to align the return of the deformation and the position in terms of data because the deformation of the cutting tool 64 will return to the original state at the time of shift of direction.

A description a description will be made about the cutting tool motion correction data (see FIG. 12B). The cutting tool motion correction data can be further divided into: a correction data when the cutting tool 64 shifts from the moved-up state (i.e., in a state in which it is out of contact with the processing tape T) to the moved-down state (i.e., in a state in which it is in contact with the processing tape T); and a correction data when the cutting tool 64 shifts from the moved-down state to the moved-up state (at the time of finishing of the cutting in).

A description will be made first about the correction data when the cutting tool 64 shifts from the moved-up state to the moved-down state. In case the cut feed motor 75 continues to rotate in the normal direction of rotation when the direction of rotation of the cut feed motor 75 does not shift before and after the shift of the cutting tool 64, the amount equivalent to the feed loss of the carriage tape feed deformation backlash ghb (1) is compensated for in the normal direction (i.e., forward direction of tape feeding) (see FIG. 12B, No. 1). In case the cut feed motor 75 continues to rotate in the reverse direction of rotation, the amount equivalent to the feed loss of the tape feed deformation backlash ghb (0) is compensated for in the reverse direction (i.e., opposite to the tape feed direction) (see FIG. 12B, No. 2).

In case the cut feed motor 75 rotates from the normal direction of rotation to the reverse direction of rotation when the direction of rotation of the carriage move motor 72 shifts before and after the shift of the cutting tool 64, the amount equivalent to the loss of the tape feed backlash grb and the tape feed deformation backlash ghb (0) is compensated for in the reverse direction (i.e., direction opposite to the tape feeding) (see FIG. 12B, No. 3). In case the cut feed motor 75 rotates from the reverse direction of rotation to the normal direction of rotation, the amount equivalent to the feed loss of the tape feed backlash grb and the tape feed deformation backlash ghb (1) is compensated for in the normal direction (i.e., normal direction of tape feeding) (see FIG. 12B, No. 4).

A description will now be made about the correction data when the cutting tool 64 shifts from the moved-down state to the moved-up state. In case the cut feed motor 75 continues to rotate in the normal direction of rotation when the direction of rotation of the cut feed motor 75 does not shift before and after the shift of the cutting tool 64, the amount equivalent to the move loss of the tape feed deformation backlash ghb (1) is compensated for in the reverse direction (i.e., direction opposite to the tape feeding) (see FIG. 12B, No. 5). In case the cut feed motor 75 continues to rotate in the reverse direction of rotation, the amount equivalent to the move loss of the tape feed deformation backlash ghb (0) is compensated for in the normal direction (i.e., normal direction of tape feeding) (see FIG. 12B, No. 6).

In case the cut feed motor 75 rotates from the normal direction of rotation to the reverse direction of rotation when the direction of rotation of the cutting tool 64 shifts before and after the shift of the cutting tool 64, the amount equivalent to the move loss of the tape feed backlash grb and the tape feed deformation backlash ghb (1) is compensated for in the reverse direction (i.e., direction opposite to the tape feeding) (see FIG. 12B, No. 7). In case the cut feed motor 75 rotates from the reverse direction of rotation to the normal direction of rotation, the amount equivalent to the feed losses of the tape feed backlash grb and the tape feed deformation backlash ghb (0) is compensated for in the normal direction (i.e., normal direction of tape feeding) (see FIG. 12B, No. 8). The compensation of the tape feed deformation backlash ghb at Nos. 5 to 8 shown in FIG. 12B is to align the return of the deformation and the position in terms of data because the deformation of the cutting tool 64 will return to the original state at the time of shift of direction from the moved-down state to the moved-up state of the cutting tool 64.

Figure 13B:
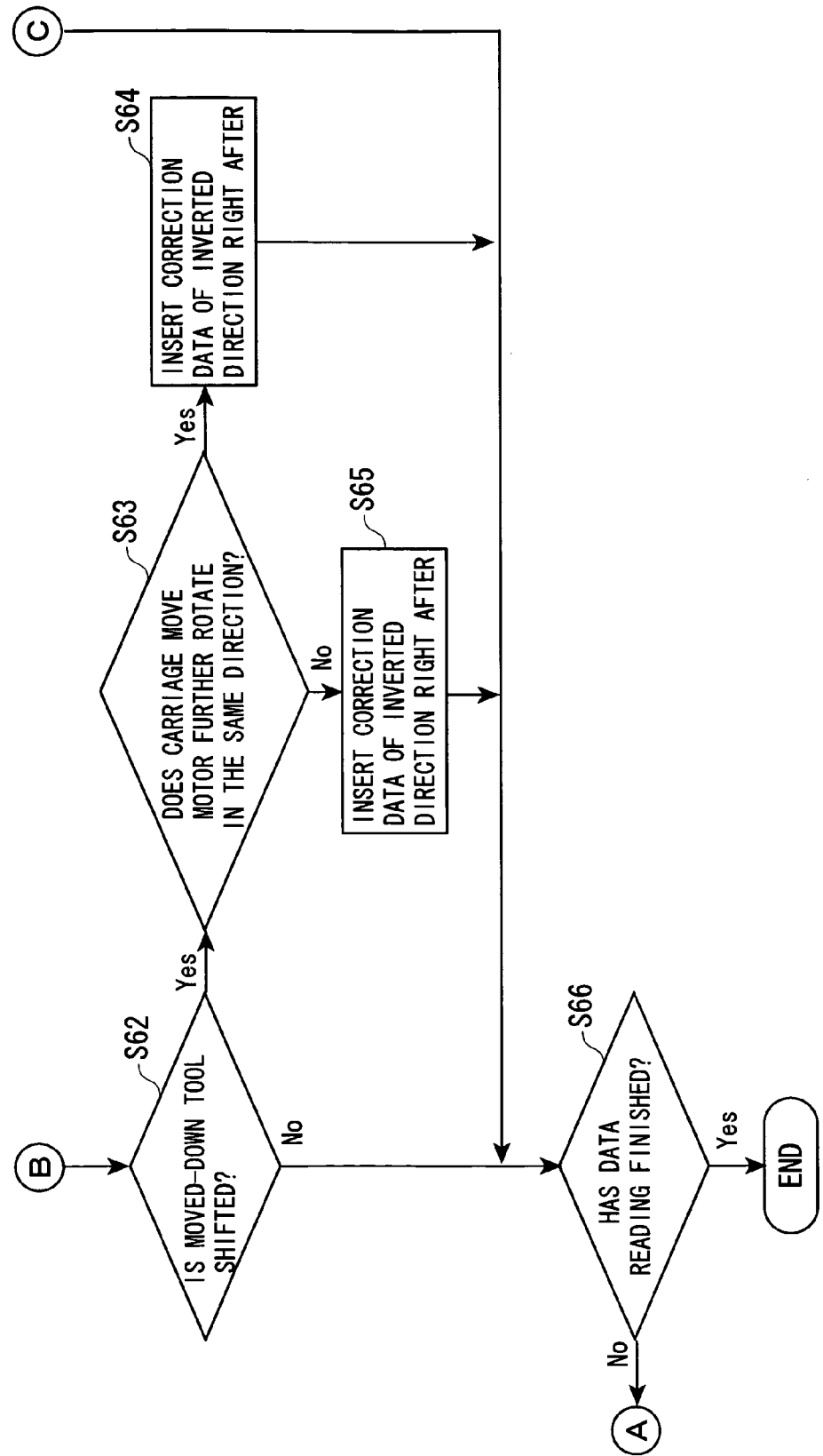
FIG. 13 (shown by dividing into 13A and 13B) is a flow chart showing the insertion of carriage movement correction data.

With reference to the flow charts in FIGS. 13 and 14, a description will now be made about the flow of correction data insertion. FIG. 13 is a flow chart showing the procedure of inserting the carriage move correction data into the carriage control data. First, a carriage move control data for one step is read (S51). Then, a comparison is made with the carriage move control data that was read immediately before. If the moved-up state of the cutting tool 64 (i.e., a state in which the cutting tool is not in contact with the processing tape T) continues (S52: Yes), a judgment is made as to whether the carriage move motor 72 is inverted (i.e., shifts its direction of rotation) or not (S53). If the carriage move motor 72 is inverted (S53: Yes), the correction data of the inverted direction is inserted into the position right after the carriage move control data now reading (S54). For example, in case the carriage move motor 72 is inverted from the normal direction of rotation to the reverse direction of rotation, the carriage move correction data to be inserted shall be No. 1 of the return correction data shown in FIG. 11A. In case the carriage move motor 72 is inverted from the reverse direction of rotation to the normal direction of rotation, the carriage move correction data to be inserted shall be No. 2 of the return correction data as shown in FIG. 11A.

In case the moved-down state of the cutting tool 64 (i.e., a state in which the cutting tool is in contact with the processing tape T) continues (S55: Yes) as a result of comparison with the carriage move control data that was red immediately before, a judgment is similarly made as to whether the carriage move motor 72 is inverted or not (S56). In case the carriage move motor 72 is inverted (S56: Yes), the correction data in the inverted direction is inserted into a position right after the carriage move correction data now reading (S57). For example, in case the carriage move motor 72 is inverted from the normal direction of rotation to the reverse direction of rotation, the carriage move correction data to be inserted shall be No. 3 of the return correction data shown in FIG. 11A. In case the carriage move motor 72 is inverted from the reverse direction of rotation to the normal direction of rotation, the carriage move correction data to be inserted shall be No. 4 of the return correction data as shown in FIG. 11A.

In case the cutting tool 64 shifts from the moved-up state to the moved-down state as a result of comparison with the carriage move control data that was read immediately before, i.e., at the starting of cutting-in (S58: Yes), a judgment is made as to whether the carriage move motor 72 further rotates in the same direction of rotation (i.e., whether the direction of rotation is the same) or not (S59). In case the carriage move motor 72 rotates in the same direction of rotation (S59: Yes), the correction data of the same direction is inserted into a position right after the carriage move control data now reading (S60). For example, in case the carriage move motor 72 continues to rotate in the normal direction of rotation, the carriage move correction data to be inserted shall be No. 1 of the cutting tool motion correction data No. 1 shown in FIG. 11B. In case the carriage move motor 72 continues to rotate in the reverse direction of rotation, the carriage move correction data to be inserted shall be No. 2 of the cutting tool motion correction data as shown in FIG. 11B.

In case the carriage move motor 72 does not rotate in the same direction of rotation (S59: No), i.e., in case the carriage move motor 72 is inverted in the direction of rotation, the correction data in the reverse direction is inserted into a position right after the carriage move control data now reading (S61). For example, in case the carriage move motor 72 is inverted from the normal direction of rotation to the reverse direction of rotation, the carriage move correction data to be inserted shall be No. 3 of the cutting tool motion correction data shown in FIG. 11B. In case the carriage move motor 72 is inverted from the reverse direction of rotation to the normal direction of rotation, the carriage move correction data to be inserted shall be No. 4 of the cutting tool motion correction data shown in FIG. 11B.

In case the cutting tool 64 shifts from the moved-down state to the moved-up state as a result of comparison with the carriage move control data that was read immediately before, i.e., at the starting of cutting-in (S62: Yes), a judgment is made as to whether the carriage move motor 72 rotates in the same direction of rotation or not (S63). In case the carriage move motor 72 rotates in the same direction of rotation (S63: Yes), the correction data in the inverted direction is inserted into a position right after the carriage move control data now reading (S64). For example, in case the carriage move motor 72 continues to rotate in the normal direction of rotation, the carriage move correction data to be inserted shall be No. 5 of the cutting tool motion correction data shown in FIG. 11B. In case the carriage move motor 72 continues to rotate in the reverse direction of rotation, the carriage move correction data to be inserted shall be No. 6 of the cutting tool correction data as shown in FIG. 11B.

In case the carriage move motor 72 does not rotate in the same direction of rotation, i.e., in case it is inverted in the direction of rotation (S63: No), the correction data of the inverted direction is inserted into a position right after the carriage move control data now reading (S65). For example, in case the carriage move motor 72 is inverted from the normal direction of rotation to the reverse direction of rotation, the carriage move correction data to be inserted shall be No. 7 of the cutting tool motion correction data shown in FIG. 11B. In case the carriage move motor 72 is inverted from the reverse direction of rotation to the normal direction of rotation, the carriage move correction data to be inserted shall be No. 8 of the cutting tool motion correction data shown in FIG. 11B. When all of the carriage move control data has been read (S66: Yes), the processing is finished.

A description will be made about the flow of insertion of the tape feed correction data. FIG. 14 is a flow chart showing the flow of inserting the tape feed correction data into the tape feed control data. First, a tape feed control data for one step is read (S71). Then, a comparison is made with the tape feed control data that was read immediately before. If the moved-up state of the cutting tool 64 (i.e., a state in which the cutting tool is not in contact with the processing tape T) continues (S72: Yes), a judgment is made as to whether the cut feed motor 75 is inverted or not (S73). If the cut feed motor 75 is inverted (S73: Yes), the correction data of the inverted direction is inserted into the position right after the tape feed control data now reading (S74). For example, in case the cutter feed motor 72 is inverted from the normal direction of rotation to the reverse direction of rotation, the tape feed correction data to be inserted shall be No. 1 of the return correction data shown in FIG. 12A. In case the cut feed motor 75 is inverted from the reverse direction of rotation to the normal direction of rotation, the tape feed correction data to be inserted shall be No. 2 of the return correction data as shown in FIG. 12A.

In case the moved-down state of the cutting tool 64 (i.e., a state in which the cutting tool is in contact with the processing tape T) continues (S75: Yes) as a result of comparison with the tape feed control data that was red immediately before, a judgment is similarly made as to whether the cut feed motor 75 is inverted or not (S76). In case the cut feed motor 75 is inverted (S76: Yes), the correction data in the inverted direction is inserted into a position right after the tape feed control data now reading (S77). For example, in case the cut feed motor 75 is inverted from the normal direction of rotation to the reverse direction of rotation, the tape feed correction data to be inserted shall be No. 3 of the return correction data shown in FIG. 12A. In case the cut feed motor 75 is inverted from the reverse direction of rotation to the normal direction of rotation, the tape feed correction data to be inserted shall be No. 4 of the return correction data as shown in FIG. 12A.

In case the cutting tool 64 shifts from the moved-up state to the moved-down state as a result of comparison with the tape feed control data that was read immediately before, i.e., at the starting of cutting-in (S78: Yes), a judgment is made as to whether the cut feed motor 75 rotates in the same direction of rotation (i.e., whether the direction of rotation is the same) or not (S79). In case the cut feed motor 75 rotates in the same direction of rotation (S79: Yes), the correction data of the same direction is inserted into a position right after the tape feed control data now reading (S80). For example, in case the cut feed motor 75 continues to rotate in the normal direction of rotation, the tape feed correction data to be inserted shall be No. 1 of the cutting tool motion correction data No. 1 shown in FIG. 12B. In case the cut feed motor 75 continues to rotate in the reverse direction of rotation, the tape feed correction data to be inserted shall be No. 2 of the cutting tool motion correction data as shown in FIG. 12B.

In case the cut feed motor 75 does not rotate in the same direction of rotation (S79: No), i.e., in case the cut feed motor 75 is inverted in the direction of rotation, the correction data in the inverted direction is inserted into a position right after the tape feed control data now reading (S81). For example, in case the cut feed motor 75 is inverted from the normal direction of rotation to the reverse direction of rotation, the tape feed correction data to be inserted shall be No. 3 of the cutting tool motion correction data shown in FIG. 12B. In case the cut feed motor 75 is inverted from the reverse direction of rotation to the normal direction of rotation, the tape feed correction data to be inserted shall be No. 4 of the cutting tool motion correction data shown in FIG. 12B.

In case the cutting tool 64 shifts from the moved-down state to the moved-up state as a result of comparison with the tape feed control data that was read immediately before, i.e., at the finishing of cutting-in (S82: Yes), a judgment is made as to whether the cut feed motor 75 further rotates in the same direction of rotation or not (S83). In case the cut feed motor 75 rotates in the same direction of rotation (S83: Yes), the correction data of the inverted direction is inserted into a position right after the tape feed control data now reading (S84). For example, in case the cut feed motor 75 continues to rotate in the normal direction of rotation, the tape feed correction data to be inserted shall be No. 5 of the cutting tool motion correction data No. 5 shown in FIG. 12B. In case the cut feed motor 75 continues to rotate in the reverse direction of rotation, the carriage move correction data to be inserted shall be No. 6 of the cutting tool motion correction data as shown in FIG. 12B.

On the other hand, in case the cut feed motor 75 does not rotate in the same direction of rotation, i.e., in case it is inverted in the direction of rotation (S83: No), the correction data in the inverted direction is inserted into a position right after the tape feed control data now reading (S85). For example, in case the cut feed motor 75 is inverted from the normal direction of rotation to the reverse direction of rotation, the tape feed correction data to be inserted shall be No. 7 of the cutting tool motion correction data shown in FIG. 12B. In case the cut feed motor 75 is inverted from the reverse direction of rotation to the normal direction of rotation, the tape feed correction data to be inserted shall be No. 8 of the cutting tool motion correction data shown in FIG. 12B. When all the tape feed control data has been read (S86: Yes), the processing is finished.

As described hereinabove, according to the cut-processing apparatus 1 of this embodiment, correction is made to the control data of the carriage move mechanism 66 and the tape feed mechanism 68 in order to compensate for: the move loss (feed loss) due to backlash of the gear train of the carriage move mechanism 66 and the tape feed mechanism 68; the backlash-like move loss (feed loss) between the timing belt and the pulley; and the move loss (feed loss) accompanied by the deformation of the constituting members in the power transmission mechanism of the carriage move mechanism 66, the move loss to be generated due to the cutting resistance between the processing tape T and the cutting tool 64. As a result, cut-processing can be performed in a desired shape at a high accuracy.

As the above-referenced information about the amount of loss, the data which is obtained by measuring once may be used or, alternatively, the data may be obtained by processing, e.g., through averaging or standard deviation of the results of plural times of measurements.

It is also possible to provide each part (or each function) of the above-referenced cut-processing apparatus 1 in the form of a program. The program can be provided in the form as stored in a storing medium (not shown). As the storing medium, there can be listed a CD-ROM, a flash ROM, a memory card (compact flash, reg. TM, smart media, memory stick, or the like), a compact disc, a magnet-optic disk, a digital versatile disc, flexible disc, or the like.

It is further understood by those skilled in the art that the foregoing is the preferred embodiment of the invention, and that various changes and modifications may be made on the apparatus construction, processing steps, or the like of the cut-processing apparatus 1 without departing from the spirit and scope thereof.

What is claimed is:

1. A cut-processing apparatus comprising:
    tool reciprocating means for reciprocating a tool by normal/reverse direction of rotation of a carriage motor through a carriage power transmission system including a carriage gear train;
    sheet feeding means for feeding a sheet synchronized with, and orthogonal to a direction of, the reciprocation of the tool, by normal/reverse direction of rotation of a sheet feed motor through a sheet feed power transmission system including a sheet feed gear train so as to cut out the sheet based on input information;
    control data generating means for generating control data based on the input information, the control data including tool move control data to reciprocate the tool and sheet feed control data to feed the sheet;
    storing means for storing an amount of loss inclusive of tool move loss due to backlash in the carriage gear train occurring at tool move direction shift and sheet feed loss due to backlash in the sheet feed gear train occurring at sheet feed direction shift; and
    correcting means for correcting the control data inclusive of the tool move control data based on the stored amount of tool move loss and the sheet feed control data based on the stored amount of sheet feed loss.

2. The apparatus according to claim 1, wherein the amount of loss further includes an amount of deformation loss due to deformation of constituting members in at least one of the tool reciprocating means and the sheet feeding means.

3. A cut-processing apparatus comprising:
a tool carriage for receiving a power of normal/reverse direction of rotation of a carriage motor through a carriage power transmission system including a carriage gear train, thereby reciprocating a tool;
a sheet feeder for transmitting a power of normal/reverse direction of rotation of a feed motor to a feed roller through a sheet feed power transmission system including a sheet feed gear train in a manner synchronized with the reciprocation of the tool so as to feed the sheet orthogonal to the direction of reciprocating the tool to cut out the sheet based on an input information;
a device for generating tool move control data to reciprocate the tool, and sheet feed control data to feed the sheet;
a device for storing an amount of tool move loss including an amount of loss due to backlash in the carriage gear train occurring at tool move direction shift and an amount of deformation loss due to deformation of members in the carriage transmission system occurring through cutting resistance, in the tool move direction, of the tool at tool move direction shift and at start/finish of cutting-in of the tool in the tool move direction;
a device for storing an amount of sheet feed loss due to backlash in the sheet feed gear train occurring at sheet feed direction shift and an amount of deformation loss due to deformation of members in the carriage transmission system occurring through cutting resistance, in the sheet feed direction, of the tool at tool move direction shift and at start/finish of cutting-in of the tool in the sheet feed direction;
a device for correcting the tool move control data, based on the stored amount of tool move loss, at tool move direction shift and at start/finish of cutting-in of the tool in the sheet feed direction; and
a device for correcting the sheet feed control data, based on the stored amount of sheet feed loss, at tool move direction shift and at start/finish of cutting-in of the tool in the sheet feed direction.

4. The apparatus according to claim 3,
wherein the device for correcting the tool move control data corrects the tool move control data right after a shift point at the tool move direction shift and at the start/finish of cutting-in of the tool in the sheet feed direction, and
wherein the device for correcting the sheet feed control data corrects the sheet feed control data right after a shift point at the sheet feed direction shift and at the start/finish of cutting-in of the tool in the sheet feed direction.

5. A cut-processing method in a cut-processing apparatus including: means for reciprocating a tool by normal/reverse direction of rotation of a carriage motor through a carriage power transmission system including a carriage gear train; and means for feeding a sheet synchronized with, and orthogonal to a direction of, the reciprocation of the tool, by normal/reverse direction of rotation of a sheet feed motor through a sheet feed power transmission system including a sheet feed gear train so as to cut out the sheet based on input information, the method comprising:
generating control data inclusive of tool move control data to reciprocate the tool and sheet feed control data to feed the sheet;
storing an amount of loss inclusive of tool move loss due to backlash in the carriage gear train occurring at tool move direction shift sheet feed loss due to backlash in the sheet feed gear train occurring at sheet feed direction shift; and
correcting control data inclusive of the tool move control data based on the stored amount of tool move loss and the sheet feed control data based on the stored amount of sheet feed loss.

6. The method according to claim 5, wherein the amount of loss further includes an amount of deformation loss due to deformation of constituting members in at least one of the tool reciprocating means and the sheet feeding means.

7. A cut-processing method in a cut-processing apparatus including:
a tool carriage for receiving a power of normal/reverse direction of rotation of a carriage motor through a carriage power transmission system including a carriage gear train, thereby reciprocating a tool; and
a sheet feeder for transmitting a power of normal/reverse direction of rotation of a feed motor to a feed roller through a sheet feed power transmission system including a sheet feed gear train in a manner synchronized with the reciprocation of the tool, thereby feeding the sheet orthogonal to the direction of reciprocating the tool to perform cutting-out of the sheet based on an input information, the method comprising:
generating tool move control data to reciprocate the tool, and sheet feed control data to feed the sheet;
storing an amount of tool move loss including an amount of loss due to backlash in the carriage gear train occurring at tool move direction shift and an amount of deformation loss due to deformation of members in the carriage transmission system occurring through cutting resistance, in the tool move direction, of the tool at tool move direction shift and at start/finish of cutting-in of the tool in the tool move direction;
storing an amount of sheet feed loss due to backlash in the sheet gear train occurring at sheet feed direction shift and an amount of deformation loss due to deformation of members in the carriage transmission system occurring through cutting resistance, in the sheet feed direction, of the tool at tool move direction shift and at start/finish of cutting-in of the tool in the sheet feed direction;
correcting the tool move control data, based on the stored amount of tool move loss, at tool move direction shift and at start/finish of cutting-in of the tool in the sheet feed direction; and
correcting the sheet feed control data, based on the stored amount of sheet feed loss, at tool move direction shift and at start/finish of cutting-in of the tool in the sheet feed direction.

8. A program which causes a computer to function as each of the devices of the cut-processing apparatus according to claim 3.

* * * * *